(12) United States Patent
Kamibayashi et al.

(10) Patent No.: US 7,065,648 B1
(45) Date of Patent: Jun. 20, 2006

(54) MUTUAL AUTHENTICATION METHOD, RECORDING APPARATUS, REPRODUCING APPARATUS, AND RECORDING MEDIUM

(75) Inventors: Tooru Kamibayashi, Chigasaki (JP); Hisashi Yamada, Yokohama (JP); Hiroshi Iwasaki, Yokohama (JP); Masafumi Tamura, Chofu (JP); Yasuhiro Ishibashi, Ome (JP); Taku Kato, Kamakura (JP); Makoto Tatebayashi, Takarazuka (JP); Shunji Harada, Osaka (JP)

(73) Assignees: Kabushiki Kaisha Toshiba, Kawasaki (JP); Matsushita Electric Industrial Co., Ltd., Osaka (JP)

( * ) Notice: Subject to any disclaimer, the term of this patent is extended or adjusted under 35 U.S.C. 154(b) by 866 days.

(21) Appl. No.: 09/593,864

(22) Filed: Jun. 15, 2000

(30) Foreign Application Priority Data

Jun. 16, 1999 (JP) ................................ 11-170187

(51) Int. Cl.
*H04L 9/00* (2006.01)
(52) U.S. Cl. ....................... 713/171; 713/172; 713/175; 380/284; 380/285; 380/46; 705/65; 705/67; 705/71
(58) Field of Classification Search ................ 380/201, 380/284, 285, 46; 705/51–59, 65, 41, 67, 705/714.4, 71; 713/169, 168, 171, 172, 173
See application file for complete search history.

(56) References Cited

U.S. PATENT DOCUMENTS 4,855,578 A * 8/1989 Hirokawa et al. .......... 235/380

| 5,146,499 A | 9/1992 | Geffrotin ...................... 380/23 |
| 5,379,433 A | 1/1995 | Yamagishi ................... 395/725 |
| 5,450,489 A | 9/1995 | Ostrover et al. ............... 380/3 |
| 5,555,304 A | 9/1996 | Hasebe et al. ................. 380/4 |
| 5,784,464 A | 7/1998 | Akiyama et al. ............. 380/25 |

(Continued)

FOREIGN PATENT DOCUMENTS

EP 0 994 475 A1 4/2000

(Continued)

OTHER PUBLICATIONS

Search Report, European Patent Office, issued Aug. 3, 2001.

*Primary Examiner*—Matthew Smithers
*Assistant Examiner*—Paul Callahan
(74) *Attorney, Agent, or Firm*—Finnegan, Henderson, Farabow, Garrett & Dunner, L.L.P.

(57) ABSTRACT

In a mutual authentication method for use between a recording apparatus which records copied contents on a recording medium having an arithmetic processing function, and the recording medium, the method includes a step of storing in the recording medium at least first information which depends on the recording medium, and second information which is to be shared by the recording apparatus in executing mutual authentication with the recording apparatus and depends on the recording medium, and a step of generating by the recording apparatus authentication information used in mutual authentication with the recording medium on the basis of the first information obtained from the recording medium, and executing mutual authentication between the recording apparatus and the recording medium using the generated authentication information and the second information.

7 Claims, 14 Drawing Sheets

U.S. PATENT DOCUMENTS

| | | | |
|---|---|---|---|
| 5,825,875 A | 10/1998 | Ugon | 380/4 |
| 5,886,979 A * | 3/1999 | Moribe et al. | 369/47.12 |
| 6,134,201 A * | 10/2000 | Sako et al. | 369/47.19 |
| 6,278,836 B1 * | 8/2001 | Kawara et al. | 386/94 |
| 6,289,102 B1 * | 9/2001 | Ueda et al. | 380/201 |
| 6,338,139 B1 * | 1/2002 | Ando et al. | 713/168 |
| 6,347,846 B1 * | 2/2002 | Nakamura | 380/203 |
| 6,353,888 B1 * | 3/2002 | Kakehi et al. | 713/168 |
| 6,360,320 B1 * | 3/2002 | Ishiguro et al. | 713/164 |
| 6,654,883 B1 * | 11/2003 | Tatebayashi | 713/168 |

FOREIGN PATENT DOCUMENTS

| | | |
|---|---|---|
| JP | 10-79174 | 3/1998 |
| JP | 11-39795 | 2/1999 |

* cited by examiner

FIG. 8A   $K_M$: GLOBAL SECRET INFORMATION (SECRET INFORMATION COMMON TO GIVEN NUMBER OF MEDIA)

REPRODUCTION

CHECK-IN

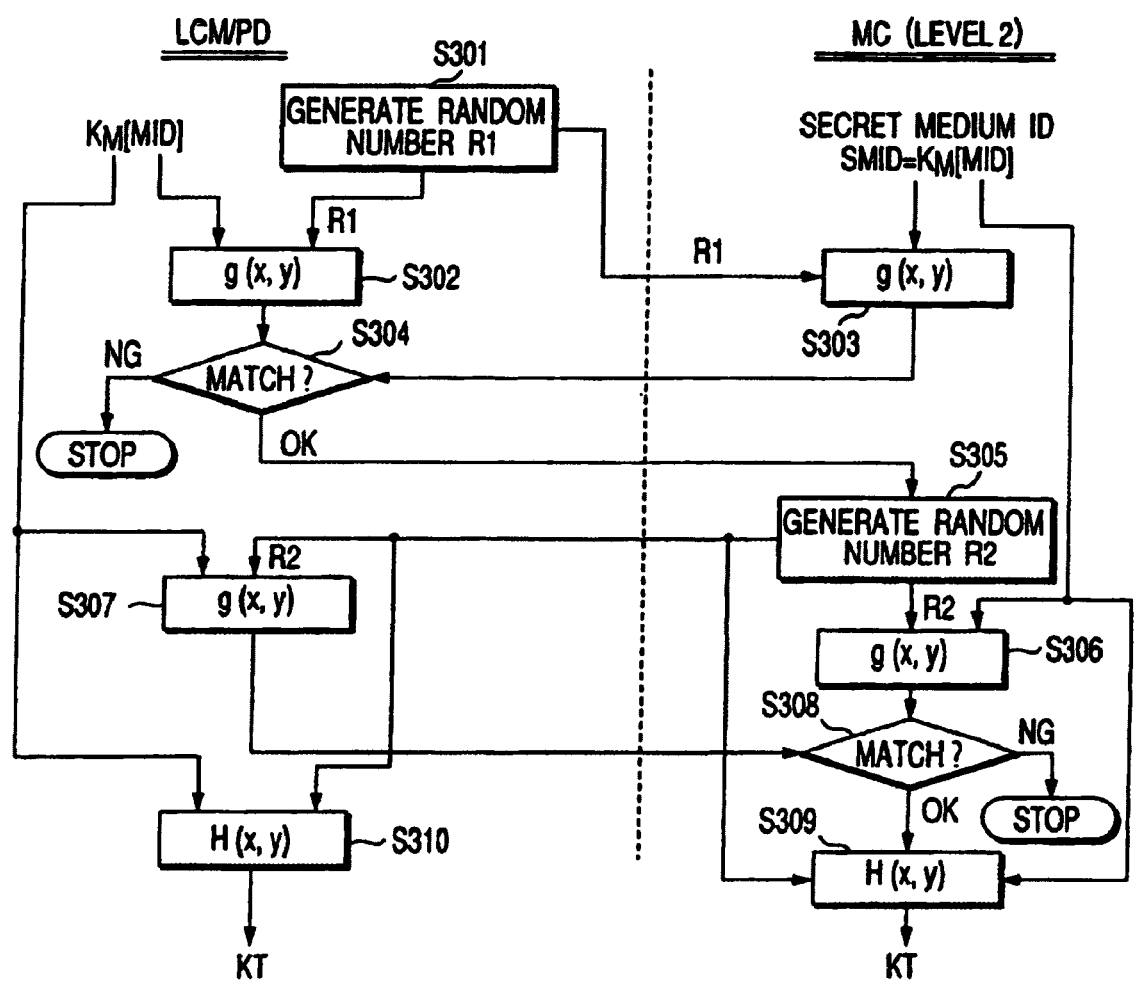
F I G. 21

MUTUAL AUTHENTICATION METHOD, RECORDING APPARATUS, REPRODUCING APPARATUS, AND RECORDING MEDIUM

CROSS-REFERENCE TO RELATED APPLICATIONS

This application is based upon and claims the benefit of priority from the prior Japanese Patent Application No. 11-170187, filed Jun. 16, 1999, the entire contents of which are incorporated herein by reference.

BACKGROUND OF THE INVENTION

The present invention relates to a mutual authentication method for use among a recording apparatus, reproducing apparatus, and recording medium, using a contents management technique that protects copyrights by limiting the number of copied contents, and a recording apparatus, reproducing apparatus, and recording medium using the method.

Conventionally, contents (literary works and the like) have undergone copy management. More specifically, by managing copy generations or the number of copies, copyright protection and use are balanced.

On the other hand, the concept "move" has appeared as an alternative to copy management. "Copy" does not erase original data, but "move" transfers data to another location (recording medium) and erases original data. As a result, a protection technique against "move" has appeared. Such technique has emerged due to digitalization of contents and prevalence of networks and the like.

However, in recent years, since copies faithful to an original can be formed via the network or the like, it becomes difficult for the conventional technique to reliably protect copyrights. Particularly, it is hard to reliably protect copyrights against unlimited moves from medium to medium, e.g., profit-making distribution (by means of move) of data.

BRIEF SUMMARY OF THE INVENTION

It is an object of the present invention to provide a mutual authentication method which can assure high information security between a recording medium and a recording apparatus that records copied contents on the recording medium, and between a recording medium and a reproducing apparatus which reproduces copied contents recorded on the recording medium, and a contents recording apparatus, reproducing apparatus, and recording medium using the method.

According to one aspect of the present invention, there is provided a mutual authentication method for use between a recording apparatus which records copied contents on a recording medium having an arithmetic processing function, and the recording medium, the method comprising the steps of: storing in the recording medium at least first information which depends on the recording medium, and second information which is to be shared by the recording apparatus in executing mutual authentication with the recording apparatus and depends on the recording medium; and generating by the recording apparatus authentication information used in mutual authentication with the recording medium on the basis of the first information obtained from the recording medium, and executing mutual authentication between the recording apparatus and the recording medium using the generated authentication information and the second information.

According to another aspect of the present invention, there is provided a mutual authentication method for use between a reproducing apparatus which reproduces copied contents recorded on a recording medium having an arithmetic processing function, and the recording medium, the method comprising the steps of: storing in the recording medium at least first information which depends on the recording medium, and second information which is to be shared by the reproducing apparatus in executing mutual authentication with the reproducing apparatus and depends on the recording medium; and generating by the reproducing apparatus authentication information used in mutual authentication with the recording medium on the basis of the first information obtained from the recording medium, and executing mutual authentication between the reproducing apparatus and the recording medium using the generated authentication information and the second information.

According to still another aspect of the present invention, there is provided a recording apparatus for recording copied contents on a recording medium while limiting the number of copied contents to be recorded on the recording medium, the apparatus comprising: generation means for generating authentication information, which is used in mutual authentication with the recording medium and is to be shared by the recording medium, on the basis of first information which is obtained from the recording medium and depends on the recording medium; and mutual authentication means for executing mutual authentication with the recording medium using the authentication information generated by the generation means.

According to still another aspect of the present invention, there is provided a reproducing apparatus for reproducing copied contents recorded on a recording medium while limiting the number of copied contents to be recorded on the recording medium, the apparatus comprising: generation means for generating authentication information, which is used in mutual authentication with the recording medium and is to be shared by the recording medium, on the basis of first information which is obtained from the recording medium and depends on the recording medium; and mutual authentication means for executing mutual authentication with the recording medium using the authentication information generated by the generation means.

According to still another aspect of the present invention, there is provided a recording medium having an arithmetic processing function, comprising: storage means for pre-storing first information which is unique to the recording medium, and second information which is to be shared by a recording apparatus for recording copied contents on the recording medium and a reproducing apparatus for reproducing the copied contents in executing mutual authentication among the recording medium, the recording apparatus, and the reproducing apparatus, and depends on the recording medium; and mutual authentication means for executing mutual authentication between the recording medium and the recording apparatus, and between the recording medium and the reproducing apparatus using authentication information generated based on the first information by the recording apparatus and the reproducing apparatus, and the second information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIG. 6 is a view for explaining the recorded contents of a recording medium after check-in;

FIGS. 8A and 8B are views for explaining an outline of a mutual authentication method;

FIG. 21 is a chart for explaining processing operation of a mutual authentication process (AKE)

DETAILED DESCRIPTION OF THE INVENTION

An embodiment of the present invention will be explained hereinafter with reference to the accompanying drawings.

Figure 1:
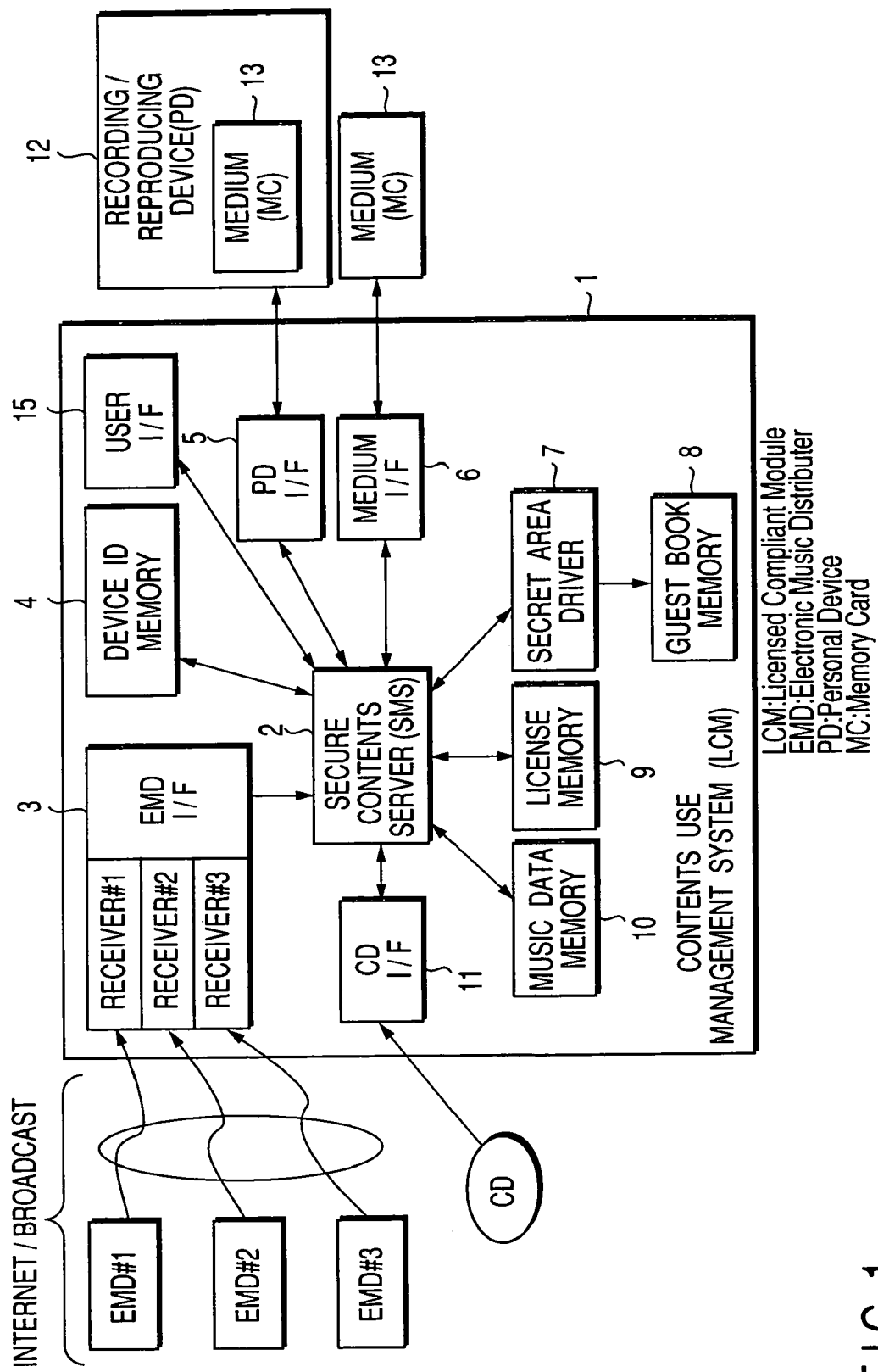
FIG. 1 is a block diagram showing an example of the arrangement of a music contents use management system (LCM) using a contents management technique for limiting the number of copied contents that can be recorded on a recording medium according to an embodiment of the present invention.

FIG. 1 shows an example of the arrangement of a music contents use management system (to be also simply referred to as an LCM hereinafter) which limits the number of copied contents that can be recorded on a recording medium according to this embodiment, and records copied contents on a medium, reproduces copied contents recorded on a medium, and so forth. Note that music is used as an example of contents. However, the present invention is not limited to such specific contents, and movies, game software programs, and the like may be used. A memory card (MC) is used as a medium. However, the present invention is not limited to such medium, and various other recording media such as a floppy disk, DVD, and the like may be used.

An EMD (Electronic Music Distributor) is a music distribution server or music distribution broadcast station.

A contents use management system 1 is, for example, a personal computer (PC), which includes receivers #1 to #3 corresponding to a plurality of EMDs (EMD#1 to EMD#3 in this case), and receives-encrypted contents, their licenses (the use condition and decryption key Kc for the encrypted contents), and the like distributed by the EMDs. Receivers #1 to #3 may have a reproducing function or a charging function. The user uses the reproducing function to listen to samples of the distributed music contents. Also, the user can purchase the contents he or she likes using the charging function.

The LCM 1 includes a secure contents server (Secure Music Server: SMS in this case; to be also simply referred to as an SMS hereinafter) 2, and the contents the user has purchased are stored in the SMS 2 via an EMD interface (I/F) 3. The music contents are decrypted by the EMD I/F 3 as needed, and undergo format conversion and re-encryption. Upon receiving the encrypted contents, the SMS 2 stores the received contents in a music data memory 10, and a music data decryption key in a license memory 9. The SMS 2 may have a reproducing function. With this reproducing function, the music contents managed by the SMS 2 can be reproduced on the PC.

The SMS 2 has a function of outputting contents data to a medium (to be also simply referred to as an MC (memory card) hereinafter) 13. The user can reproduce the contents recorded on the MC 13 by setting it in a recording/reproducing device (to be also simply referred to as a PD (Portable Device) hereinafter.

The SMS 2 records contents on the MC 13 directly via a medium (MC) interface 6 or with the intervention of the PD 12.

A device ID memory 4 includes, e.g., a ROM which stores identification information (device ID) of the LCM.

The MC 13 has identification information (MID) which is unique to that medium and cannot be rewritten, and the contents stored in the MC 13 may be encrypted by an encryption key which depends on the MC 13.

A check-in/check-out process will be explained first using the LCM 1 shown in FIG. 1.

The check-out process means making a copy of "parent" contents stored in the LCM 1 on the MC 13 as "child" contents. The "child" contents can be freely reproduced by the PD 12, but it is not allowed to form "grandchild" contents from the "child". The number of "children" "parent" can have is defined as an attribute of "parent". On the other hand, the check-in process means erasing (or disabling to use) "child" contents by the LCM 1 when the MC 13 is connected to the LCM 1, thereby recovering the right of "parent" contents in the LCM 1 to form one "child". This process is also called check-in at "parent".

When this check-in/check-out process is simply implemented by the conventional LCM 1, the following "attack" is present in practice. More specifically, "child" stored in the MC 13 is saved in another recording medium (by removing its MID), and "child" in the MC 13 checks in at "parent".

The previously saved "child" is written back to that MC 13. Since check-in has already been done, "parent" on the LCM 1 can copy "child" on another MC 13. This method can form an arbitrary number of "children" that can be used.

The aforementioned "attack" can be defended by authentication in data transfer between the MC 13 and LCM 1. That is, assume that the MC 13 does not accept data transfer from an LCM other than an authentic LCM 1, and the LCM 1 does not accept data transfer from an MC other than an authentic MC 13. In this case, "child" in the MC 13 cannot be saved in another recording medium. Also, disguised check-in cannot be done at the LCM 1. Therefore, the aforementioned "attack" is no longer effective.

However, the check-in/check-out process cannot be implemented even under the premise of authentication between the LCM 1 and MC 13, because of the presence of the following "attack". That is, before "parent" on the LCM 1 forms any "child", data of the LCM 1 (especially, information in the license memory 9) is backed up to another recording medium. After "child" is copied to the MC 13, the backed-up data of the LCM 1 is restored. Since "parent" of the LCM 1 recovers the state before it forms "child", it can form "child" on another MC 13. In this manner, an arbitrary number of "children" can be formed.

Figure 2:
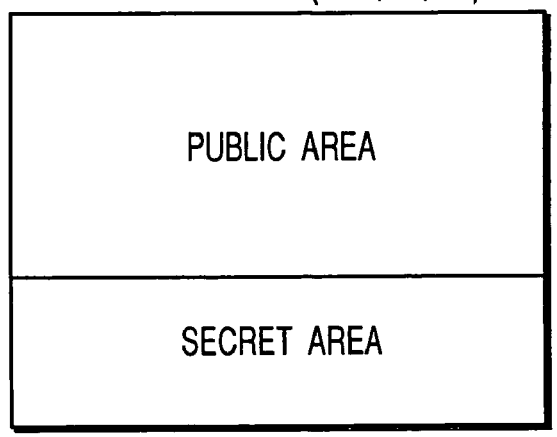
FIG. 2 shows an example of the map of a memory area.

In order to implement the check-in/check-out process that can defend such attack, an area (secret area) which cannot be accessed by a public procedure is assured on the storage area of the MC 13, and is used to record information required for mutual authentication and information required for contents decryption, an identification information (device ID) list (revocation list (RVC list)) of devices (LCM 1, PD 12) that cannot be accessed, and the like (see FIG. 2). Also, an area (secret area) that can be accessed by only a private procedure is assured on the storage area (e.g., a hard disk (HDD) when the LCM 1 is constituted by a PC) of the LCM 1, and is used to store a guest book (to be described later) (see FIG. 2). Furthermore, an area (secret area) that can be accessed by only a private procedure may also be assured on the storage area of the PD 12, and may be used to record information required for contents decryption (see FIG. 2). Note that an area other than the secret area in the storage area, which can be accessed by a normal procedure, will be referred to as a public area.

As shown in FIG. 1, the LCM 1 includes a guest book memory 8 assured on the secret area, and a secret area driver 7 for reading data from the secret area after the SMS 2 executes a specific secret procedure for accessing this guest book memory 8.

Figure 4A:
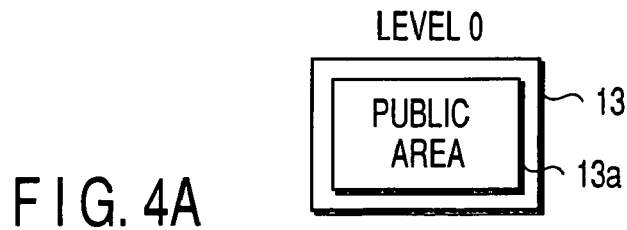
FIGS. 4A to 4C are views for explaining the features of three different recording media.
Figure 4B:
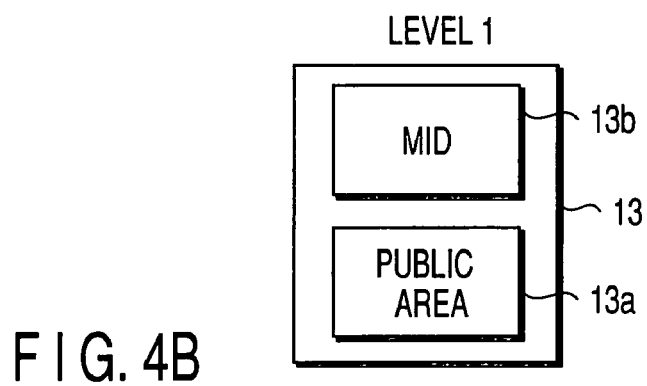
Figure 4C:
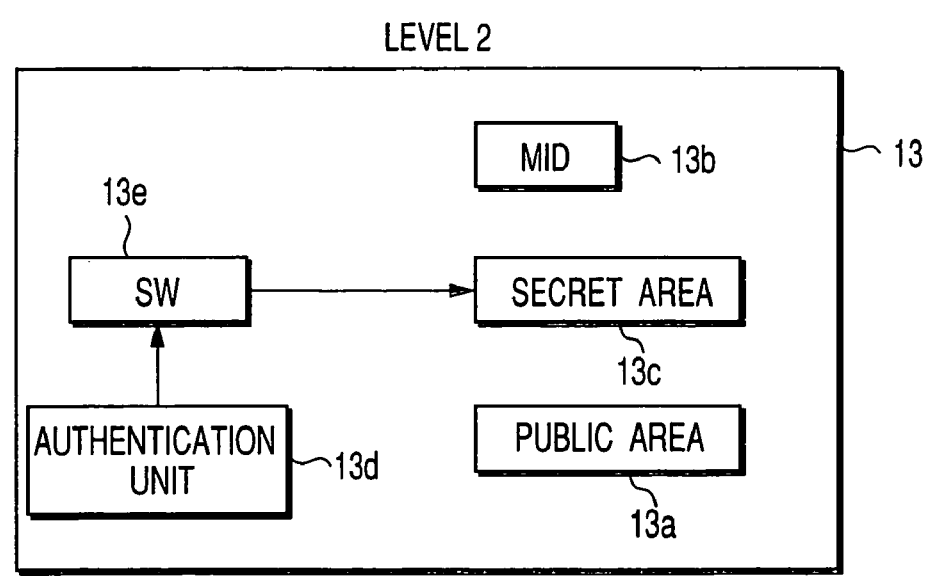

As shown in FIG. 4C, the MC 13 includes an identification information memory (ROM) 13b which stores identification information MID of the MC 13, and cannot be externally rewritten and copied, a secret area 13c, a public area (rewritable RAM) 13a, and a switch (SW) 13e which opens a gate to allow access to the secret area 13c only when an authentication unit 13d authenticates and confirms an authentic partner every time the secret area 13c is accessed.

Note that three different types of MCs 13 can be used in this embodiment. The type of MC 13 which has both identification information MID and the secret area, as shown in FIG. 4C, is called "level 2". The type of MC 13 which does not have any secret area but has identification information MID, as shown in FIG. 4B, is called "level 1". The type of MC 13 which has neither the secret area nor identification information, and has only a public area, as shown in FIG. 4A, is called "level 0". In order to discriminate these types, for example, level 0 can be discriminated from other types by checking the presence/absence of identification information MID, and levels 1 and 2 can be discriminated based on the format of identification information MID. For example, when identification information is a serial number, a medium having identification information equal to or larger than a predetermined value is determined to be level 2.

An MC 13 of level 2 will be exemplified below unless otherwise specified.

The MC 13 is set in the PD 12 connected to the LCM 1 or is directly set in the LCM 1 when it is used.

Figure 3:
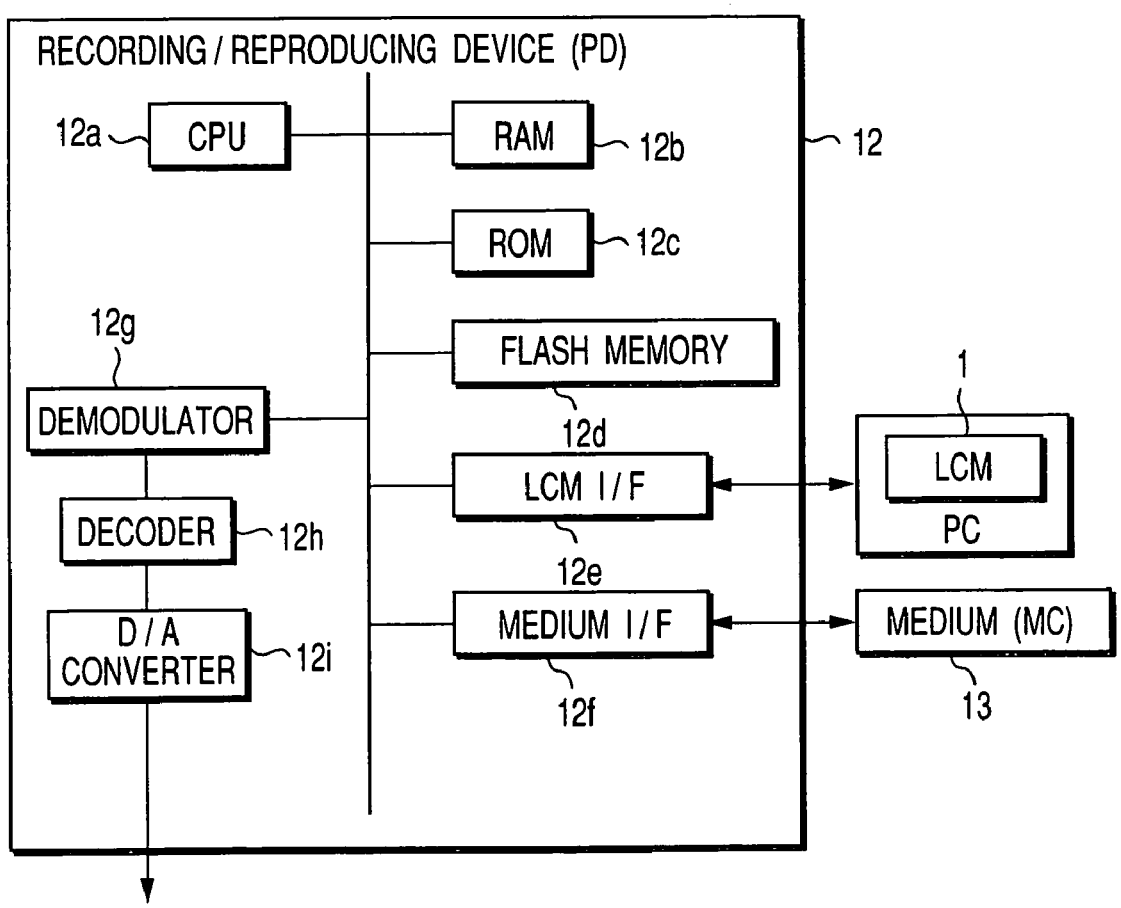
FIG. 3 is a block diagram showing an example of the internal arrangement of a recording/reproducing device (PD)

FIG. 3 shows an example of the arrangement of the PD 12, and the MC 13 is set in a medium interface (I/F) 12f. When the LCM 1 reads/writes data to/from the MC 13 via the PD 12, it accesses the secret area of the MC 13 via a secret area access unit in the PD 12. The medium I/F 12f includes a secret area access unit for accessing the secret area of the MC 13. The secret area in the PD 12 may be assured on a flash memory 12d. A ROM 12c is written with a mutual authentication program between the MC 13 and LCM 1, a program that describes an authentication procedure required for accessing the secret area, and a program for discriminating the type of MC 13. According to these programs, various processes such as authentication, type discrimination, and the like with the MC 13 are executed under the control of a CPU 12a.

The ROM 12c may also store identification information (device ID) of the PD 12. For example, the secret area assured on the flash memory 12d pre-stores a secret device ID (SPDID).

Figure 5:
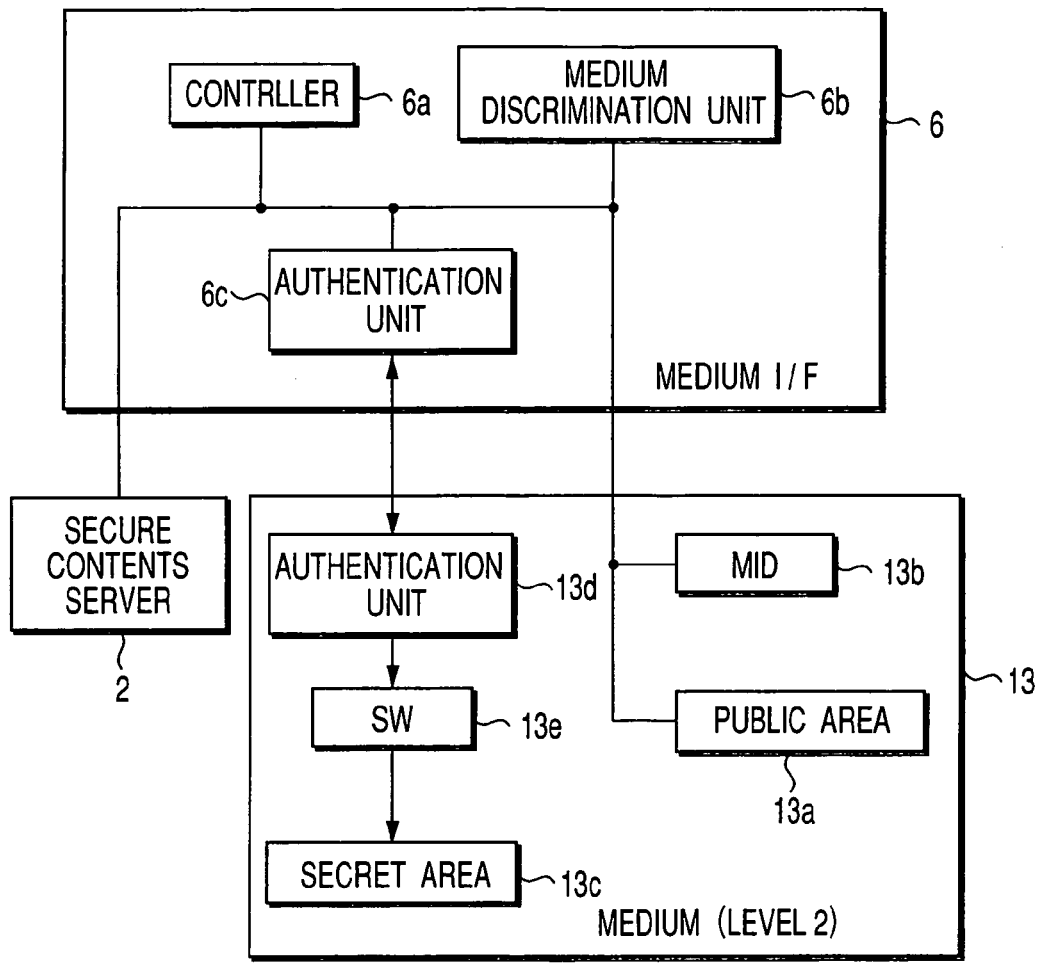
FIG. 5 is a block diagram showing an example of the internal arrangement of a medium interface (I/F)

FIG. 5 shows the arrangement of the medium I/F 6 of the LCM 1. The medium I/F 6 includes an authentication unit 6c for performing mutual authentication with the MC 13, a medium discrimination unit 6b for determining the type of MC 13, and a controller 6a for controlling all these units. The authentication unit 6c also serves as a secret area access unit which accesses the secret area of the MC 13.

The guest book stored in the secret area of the LCM 1 will be explained below.

All music contents held in the SMS 2 have contents IDs (TIDS) as identification information for identifying the individual contents, and the predetermined number of contents that can be copied, i.e., the remaining number of children and a check-out list as their attribute information. This attribute information is called a guest book. The guest book is recorded on the guest book memory 8 assured on the secret area in the format shown in FIG. 7A.

Figure 7A:
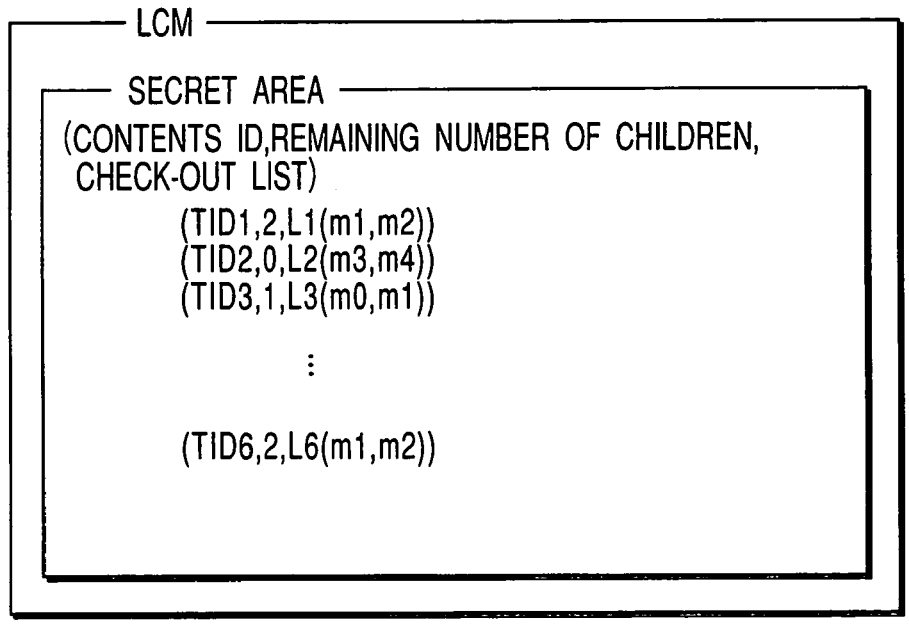
FIGS. 7A to 7C show storage examples of guest books stored in a secret area of an LCM.

Referring to FIG. 7A, the remaining number of children of contents ID="TID1" is "2" and its check-out list is L1.

The check-out list is a list of identification information of the MCs 13 which record copied contents (children). For example, as can be seen from check-out list L1 in FIG. 7A, children of the contents having a contents ID="TID1" are checked out to two MCs 13 respectively having identification information="m1" and "m2".

The following items will be explained in turn below.

1. Outline of mutual authentication method
2. Check-in/check-out/reproduction process of copied contents using MC of level 2
3. Check-in/check-out/reproduction process of copied contents using MC of level 0

1. Outline of Mutual Authentication Method

In order to safely implement the check-in/check-out process, mutual authentication must be done among the LCM 1, PD 12, and MC 13 as described above (to confirm, e.g., if they have an identical algorithm). In general, the mutual authentication process must have secret information shared by the partners which are to authenticate each other. Therefore, for example, the MC 13, LCM 1, and PD 12 have such secret information. In terms of information security, this secret information is preferably a dynamic one which is generated to have a different value every time authentication is done. However, if a high-grade function of generating such secret information is added to the medium itself, i.e., the MC 13, the medium becomes expensive. In order to promote further prevalence of media to public, the medium is preferably as inexpensive as possible. Therefore, secret information is preferably pre-stored in the MC 13 to reduce the cost of the medium (MC 13).

However, when secret information which is common to all media or a given number of media (such information will be referred to as global secret information hereinafter) is pre-stored in respective media, if the secret information is read from a given medium by some method, other media that store identical secret information may be illicitly used. It is therefore very dangerous to store global secret information in media (see FIG. 8A).

Even when secret information stored in a given medium is read by an unauthorized user, if it is only the medium from which the secret information has been read that can be illicitly used, no serious problem is posed. For this reason, the secret information need only be unique to each medium.

Figure 8B:
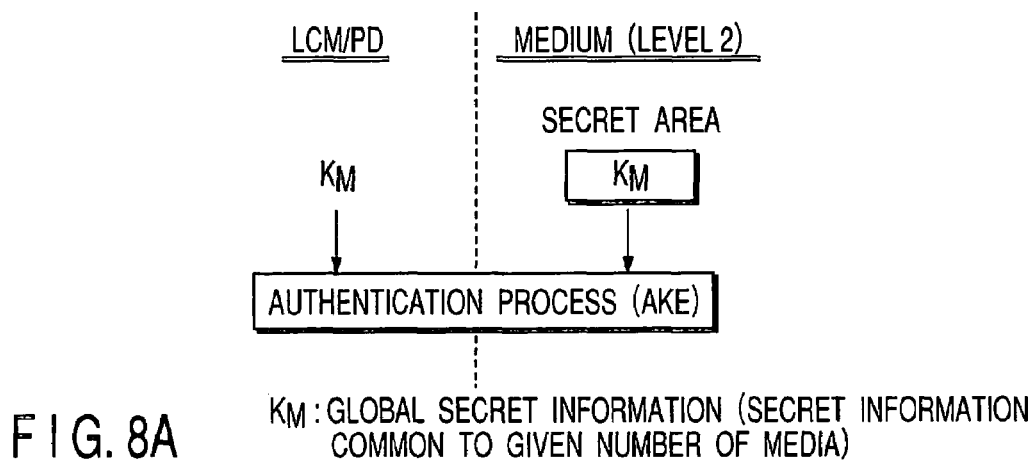
Figure 8B:
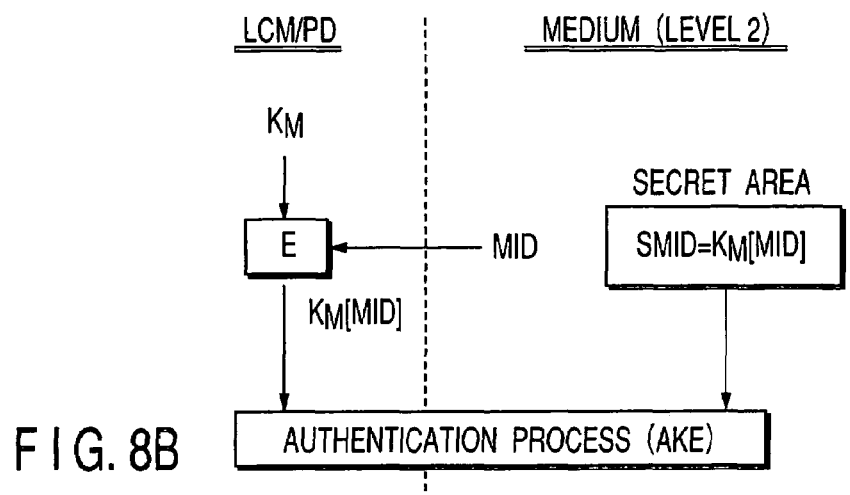

In this embodiment, secret information for mutual authentication, which information differs in units of media, is stored in each media, and the LCM 1 or PD 12 and MC 13 perform mutual authentication using the stored information, thereby providing a safe mutual authentication method that uses a low-cost medium and can assure higher security. More specifically, the mutual authentication method described in this embodiment pre-stores, in (the secret area of) each medium (medium of level 2), secret information (in this case, secret medium ID (SMID): which is obtained by encrypting a medium ID using key information $K_M$ acquired by some method), which differs in units of media and is required for mutual authentication (AKE), and transfers identification information (MID) of that medium to the LCM 1 and PD 12, as shown in FIG. 8B. The LCM 1 or PD 12 generates information (which is the same as SMID of the medium) for mutual authentication) using MID and information ($K_M$) acquired by some method in accordance with a predetermined algorithm and executes a mutual authentication process (AKE: authentication and key exchange)).

In this manner, by storing unique secret information (SMID) in each MC 13, the LCM 1 or PD 12 generates secret information (SMID) on the basis of information (MID) unique to each medium, which is transferred from the medium, thereby implementing safe mutual authentication without imposing any heavy load on the medium.

Note that the mutual authentication process according to the gist of the present invention will be referred to as AKE hereinafter.

Figure 9:
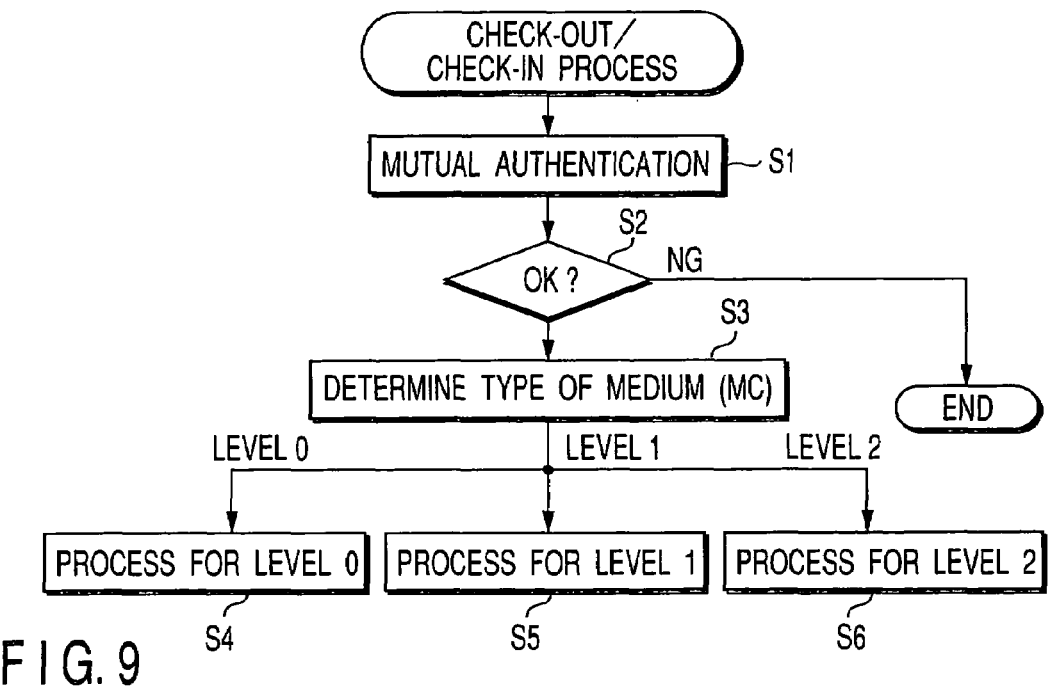
FIG. 9 is a flow chart for explaining a check-in/check-out process sequence.

When the MC 13 is set in the medium I/F 6 of the LCM 1 or the PD 12, mutual authentication may be done first between the medium I/F 6 and MC 13 or between the PD 12 and MC 13 (step S1 in FIG. 9). If it is determined that both of them are authentic (e.g., they have hardware arrangements complying with the same standards) (step S2), the medium I/F 6 or PD 12 determines the type of MC 13 on the basis of identification information MID read from the MC 13 (step S3). The medium I/F 6 or PD 12 executes a check-in/check-out/reproduction process according to the determined type (step S6).

Note that mutual authentication in step S1 in FIG. 9 need not always be that according to the gist of the present invention shown in FIG. BB.

In the above description, three different types of MCs 13, i.e., MCs 13 of level 0 to level 2, are available, but the check-in/check-out/reproduction process operations of the copied contents in FIG. 9 and the subsequent figures will be explained for two types of MCs 13, i.e., MCs 13 of level 0 and level 2.

Furthermore, in accessing each others secret areas between the LCM 1 and MC 13, the LCM 1 and PD 12, and the PD 12 and MC 13, assume that they authenticate each other, open gates to each other's secret areas if it is confirmed that they are authentic, and close the gates that allow access to the secret areas (although not described in the following description) after access to the secret areas is completed. For example, between the LCM 1 and MC 13, the SMS 2 makes mutual authentication with the MC 13 so as to access the secret area 13c of the MC 13. If their authenticity is confirmed and the switch 13e opens the gate to the secret area 13c, the SMS 2 writes key information in the secret area 13c, and the switch 13e closes the gate that allows access to the secret area 13c upon completion of the write.

2. Check-In/Check-Out/Reproduction Process of Copied Contents Using MC of Level 2

The check-in/check-out/reproduction process using the MC 13 of level 2 with the format shown in FIG. 4C will be explained below.

A case will be explained below with reference to FIG. 10 wherein a check-out instruction is issued to the SMS 2 via a user interface (I/F) 15 or via the PD 12 (i.e., when the MC 13 is set in the PD 12 connected to the LCM 1).

The SMS 2 checks the remaining number n of children of contents (e.g., having a contents ID="TID1") corresponding to a check-out request of the guest book. If n>0, the SMS 2 reads out the device ID (LCMID) of the corresponding LCM 1 from the device ID memory 4, and transfers it to the MC 13 (step S101).

The MC 13 checks if the transferred device ID is registered in the RVC list (step S102). If the transferred device ID is not registered, the MC 13 reads out master key $K_M$ by accessing the secret area 13c, and transfers it to the LCM 1 (step S103). Furthermore, the MC 13 reads out its identification information (MID) from the identification information memory 13b and transfers it to the LCM 1 (step S104).

The LCM 1 encrypts the medium ID (MID) transferred from the MC 13 using master key $K_M$ to generate information ($K_M$[MID]) required for a mutual authentication process (AKE) (step S105).

The LCM 1 executes the mutual authentication process (AKE) using the generated information $K_M$[MID], while the MC 13 executes the mutual authentication process (AKE) using a secret medium ID (SMID) (step S106). In this mutual authentication process (AKE), the LCM 1 and MC 13 share identical functions g(x, y) and H(x, y), and if the information $K_M$[MID] generated by the LCM 1 is the same as the secret medium ID (SMID) of the MC 13, they can confirm their authenticity by the mutual authentication process (AKE).

The processing operation of the mutual authentication process (AKE) in step S106 will be explained below with reference to FIG. 21.

The LCM 1 generates random number R1 (step S301), and transfers it to the MC 13. At the same time, the LCM 1 substitutes random number R1 in one variable of function g(x, y) having two variables. Also, the LCM 1 substitutes the information $K_M$[MID] generated in step S105 in FIG. 10 in the other variable of function g(x, y) to obtain the value of function g (step S302).

On the other hand, the MC 13 substitutes random number R1 transferred from the LCM 1 in one variable of function g(x, y), substitutes its own secret medium ID (SMID) in the other variable, and transfers the obtained value of function g to the LCM 1 (step S303).

The LCM 1 compares the value of function g transferred from the MC 13, and that computed by itself, and executes a subsequent process if they match. If the two values do not match, the AKE process on the LCM 1 side is canceled at that time (step S304).

The MC 13 then generates random number R2 (step S305), and transfers it to the LCM 1. At the same time, the MC 13 substitutes random number R2 in one variable of function g(x, y) having two variables. Also, the MC 13 substitutes its secret medium ID (SMID) in the other variable of function g(x, y) to obtain the value of function g (step S306).

Figure 10:
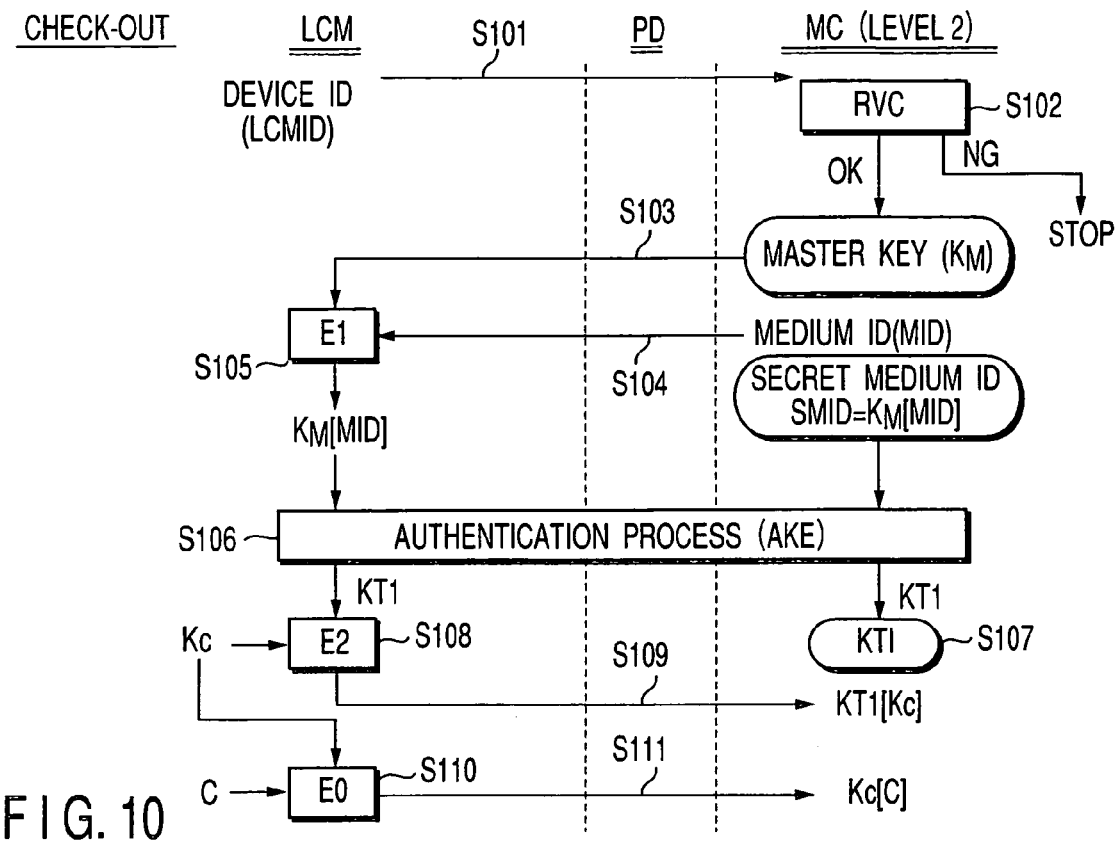
FIG. 10 is a chart for explaining a sequence of check-out when the type of recording medium is level 2.

On the other hand, the LCM 1 substitutes random number R2 transferred from the MC 13 in one variable of function g(x, y), and substitutes the information $K_M[MID]$ generated in step S105 in FIG. 10 in the other variable of function g(x, y) to obtain the value of function g. The LCM 1 then transfers the obtained value to the MC 13 (step S307).

The MC 13 compares the value of function g transferred from the LCM 1, and that computed by itself, and executes a subsequent process if they match. If the two values do not match, the AKE process on the MC 13 side is canceled at that time (step S308).

If the values of function g match in step S308, the MC 13 substitutes random number R2 in one variable of function H(x, y) having two variables, and its secret medium ID (SMID) in the other variable to generate key information KT (step S309).

Also, if the values of function g match in step S304, the LCM 1 substitutes random number R2 transferred from the MC 13 in one variable of function H(x, y), and substitutes the information $K_M[MID]$ generated in step S105 in FIG. 10 in the other variable to generate key information KT (step S310).

Note that two pieces of key information KT, which are generated by the LCM 1 and MC 13 using the identical function H(x, y) if it is determined in steps S304 and S308 that the values of function g match, are the same ones. The LCM 1 and MC 13 then exchange contents decryption key Kc using this key information KT.

The mutual authentication process (AKE) preferably generates different key information KT in each authentication in terms of security. In this case, since random number R2 newly generated for each authentication is substituted in one of two variables which are substituted in function H used to generate key information KT, different key information KT can be generated for each authentication.

Referring back to FIG. 10, if the LCM 1 and MC 13 confirm in step S106 that they are authentic, the MC 13 stores the generated key information KT (in this case, KT1) in the secret area (step S107). The LCM 1 encrypts a decryption key (contents decryption key) Kc used to decrypt the encrypted contents (KT1[Kc]) using the key information KT1 generated in step S106, and transfers it to the MC 13 (steps S108 and S109). Also, the LCM 1 encrypts contents C using Kc (Kc[C]), and transfers the encrypted contents to the MC 13 (steps S110 and S111).

Figure 7B:
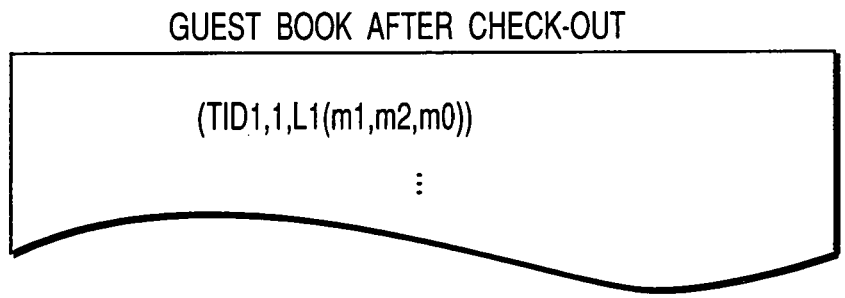

Finally, the SMS 2 subtracts "1" from the remaining number n of children of the contents with the contents ID="TID1" corresponding to the check-out request of the guest book, and adds identification information "m0" of that MC 13 in check-out list L1, as shown in FIG. 7B.

The MC 13 stores transferred encrypted contents decryption key KT1[Kc] and encrypted contents Kc[C] in the public area 13a.

Figure 6:
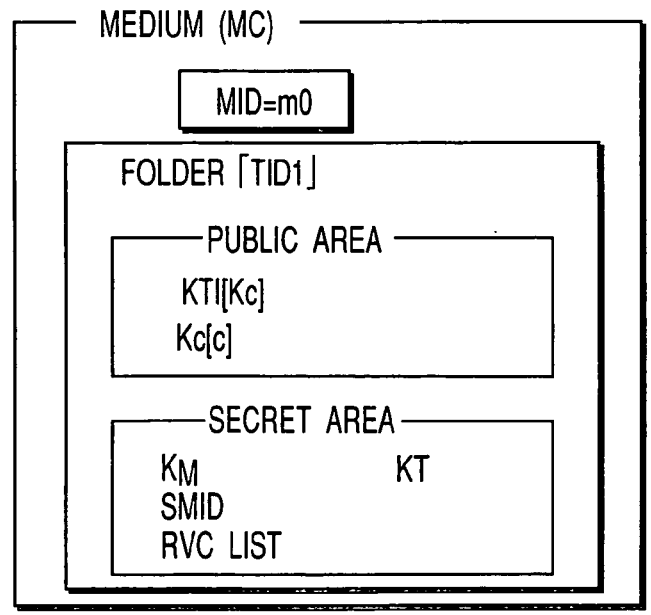

FIG. 6 shows the storage contents of the MC 13 at completion of the aforementioned processes.

Figure 11:
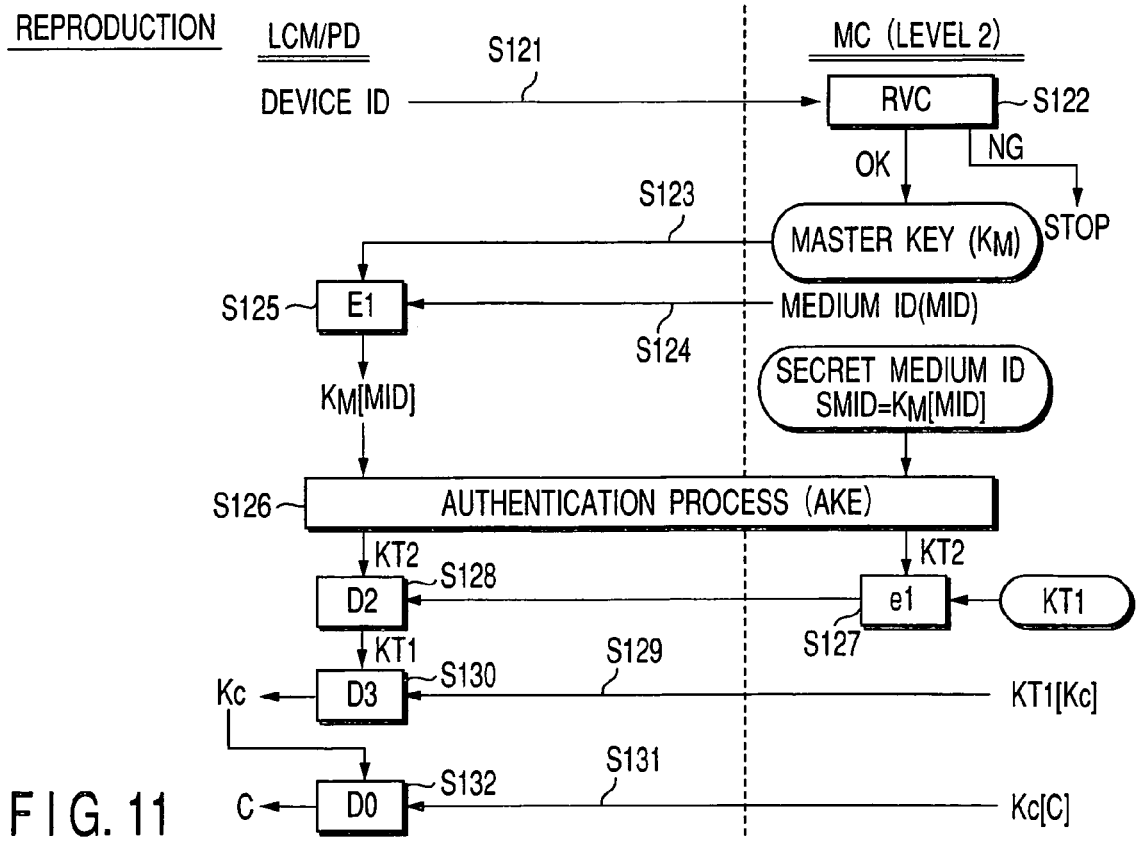
FIG. 11 is a chart for explaining a sequence of reproduction when the type of recording medium is level 2.

A case will be explained below with reference to FIG. 11 wherein a reproduction instruction is issued to the SMS 2 via the user interface (I/F) 15 of the LCM 1 or to the PD 12.

The PD 12 or LCM 1 transfers its own device ID to the MC 13 (step S121).

If the LCM 1 has the same contents reproducing function (demodulator 12g, decoder 12h, D/A converter 12i, and the like) as that the PD 12 shown in FIG. 3, the contents of the MC 13 can be similarly reproduced by the PD 12 and LCM 1. A reproduction process by the PD 12 will be exemplified below.

The MC 13 checks if the transferred device ID is registered in the RVC list (step S122). If the device ID is not registered, the MC 13 reads out master key $K_M$ by accessing the secret area 13c, and transfers it to the PD 12 (step S123). Furthermore, the MC 13 reads out its identification information (MID) from the identification information memory 13b and transfers it to the PD 12 (step S124).

The PD 12 encrypts the medium ID (MID) transferred from the MC 13 using master key $K_M$ to generate information ($K_M[MID]$) required for a mutual authentication process (AKE) (step S125).

The PD 12 executes the mutual authentication process (AKE) using the generated information $K_M[MID]$, while the MC 13 executes the mutual authentication process (AKE) using a secret medium ID (SMID) (step S126). Since the mutual authentication process in step S126 is the same as that shown in FIG. 21, a description thereof will be omitted.

If the PD 12 and MC 13 confirm that they are authentic, the MC 13 encrypts key information KT1 stored in the secret area 13c using the generated key information KT (in this case, KT2) (KT2[KT1]) and transfers it to the PD 12 (steps S127 and S128). On the other hand, the PD 12 can decrypt KT2[KT1] transferred from the MC 13 using key information KT2 generated in step S126 (step S128).

The MC 13 reads out encrypted contents decryption key KT1[Kc] and encrypted contents Kc[C] from the public area 13a and transfers them to the PD 12 (steps S129 and S131).

If key information KT1 has been successfully decrypted, the PD 12 can obtain contents decryption key Kc by decrypting contents decryption key KT1[Kc] which was encrypted using KT1 (step S130). Accordingly, it decrypts encrypted contents Kc[C] using that contents decryption key Kc to obtain contents C (step S132). In the PD 12, the decoder 12h decodes contents C, and the D/A converter 12i converts the decoded contents from a digital signal into an analog signal, thereby reproducing the copied contents (e.g., music) recorded on the MC 13.

Figure 12:
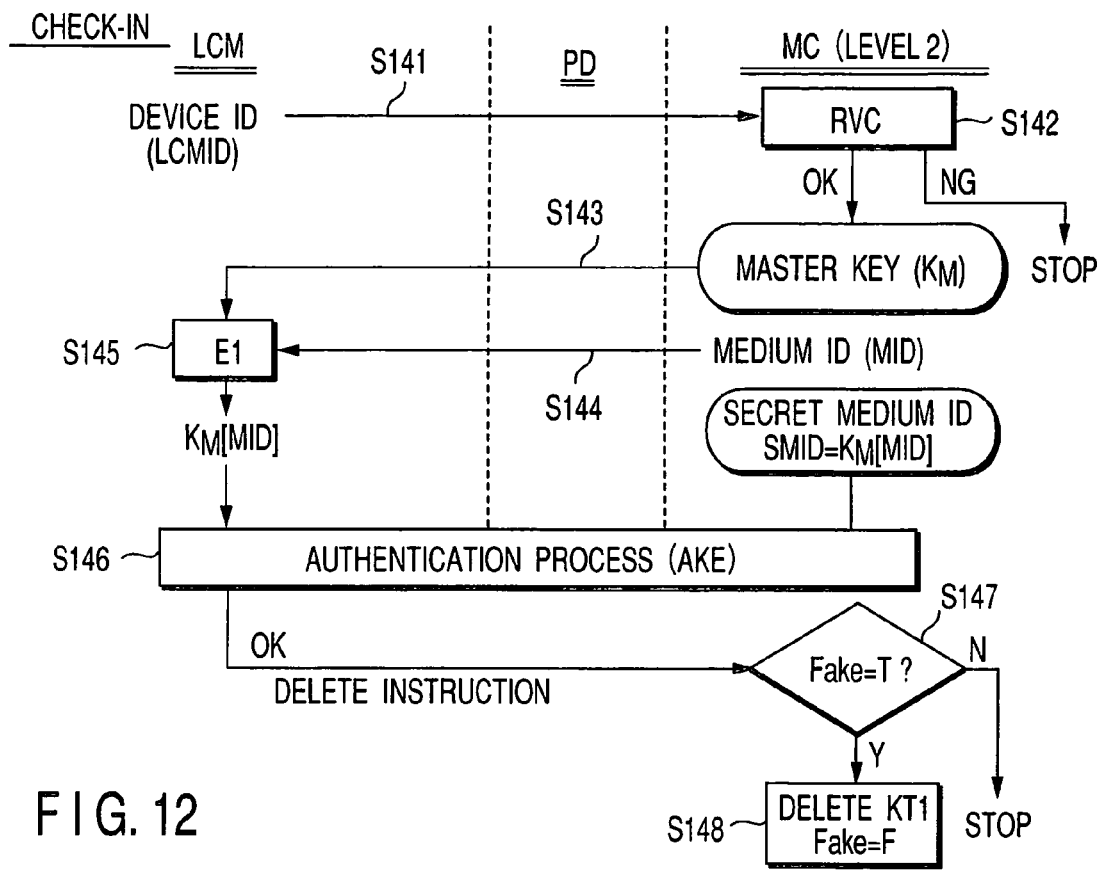
FIG. 12 is a chart for explaining a sequence of check-in when the type of recording medium is level 2.

A case will be explained below with reference to FIG. 12 wherein a check-in instruction is issued to the SMS 2 via the user interface (I/F) 15 of the LCM 1 or via the PD 12 (i.e., when the MC 13 is set in the PD 12 connected to the LCM 1).

The SMS 2 reads out the device ID (LCMID) of that LCM 1 from the device ID memory 4, and transfers it to the MC 13 (step S141).

The MC 13 checks if the transferred device ID is registered in the RVC list (step S142). If the transferred device ID is not registered, the MC 13 reads out master key $K_M$ by accessing the secret area 13c, and transfers it to the LCM 1 (step S143). Furthermore, the MC 13 reads out its identification information (MID) from the identification information memory 13b and transfers it to the LCM 1 (step S144).

The LCM 1 encrypts the medium ID (MID) transferred from the MC 13 using master key $K_M$ to generate information ($K_M$[MID]) required for a mutual authentication process (AKE) (step S145).

The LCM 1 executes the mutual authentication process (AKE) using the generated information $K_M$[MID], while the MC 13 executes the mutual authentication process (AKE) using a secret medium ID (SMID) (step S146).

The mutual authentication process (AKE) of step S146 in check-in will be explained below with reference to FIG. 22. Note that the same reference numerals denote the same portions as those in FIG. 21, and only different portions will be explained below. That is, in FIG. 22 if it is determined in step S308 that the values of function g match, the value of flag information Fake is set to be "true" (indicated by "T" in FIG. 22) in place of generating key information KT; if they do not match, the value of flag information Fake is set to be "false" (indicated by "F" in FIG. 22) (steps S321 and S322). If the values of function g match in step S304, the LCM 1 outputs only that determination result in place of generating key information KT.

Referring back to FIG. 12, if the LCM 1 confirms authenticity of the MC 13 in step S146 (step S304 in FIG. 22), it instructs the MC 13 to delete key information KT1 stored in the secret area 13c of the MC 13. Upon receiving this instruction, the MC 13 checks the value of flag information Fake. If Fake="T", the MC 13 deletes key information KT1 from the secret area 13c, and rewrites flag information Fake to "F" (steps S147 and S148). At this time, the encrypted contents stored in the public area 13a of the MC 13 may be erased by overwriting random numbers generated by the LCM 1 on them.

Figure 7C:
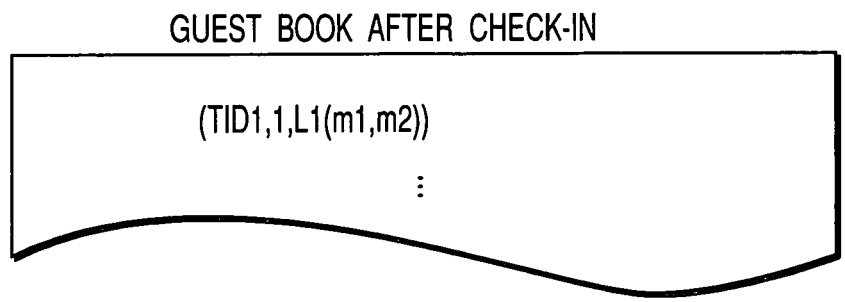

Finally, as shown in FIG. 7C, the SMS 2 adds "1" to the remaining number n of the contents with the contents ID="TID1" corresponding to the check-in request of the guest book, and deletes identification information m0 of that MC 13 from check-out list L1.

On the other hand, if the value of flag information Fake is "F", the subsequent process is canceled.

The processing operation in check-out, which is different from that shown in FIG. 10, will be described below with reference to FIG. 13. Note that the same reference numerals denote the same portions as those in FIG. 10, and only different portions will be explained below. That is, FIG. 13 is characterized by a process for contents decryption key Kc to be transferred to the MC 13.

Figure 13:
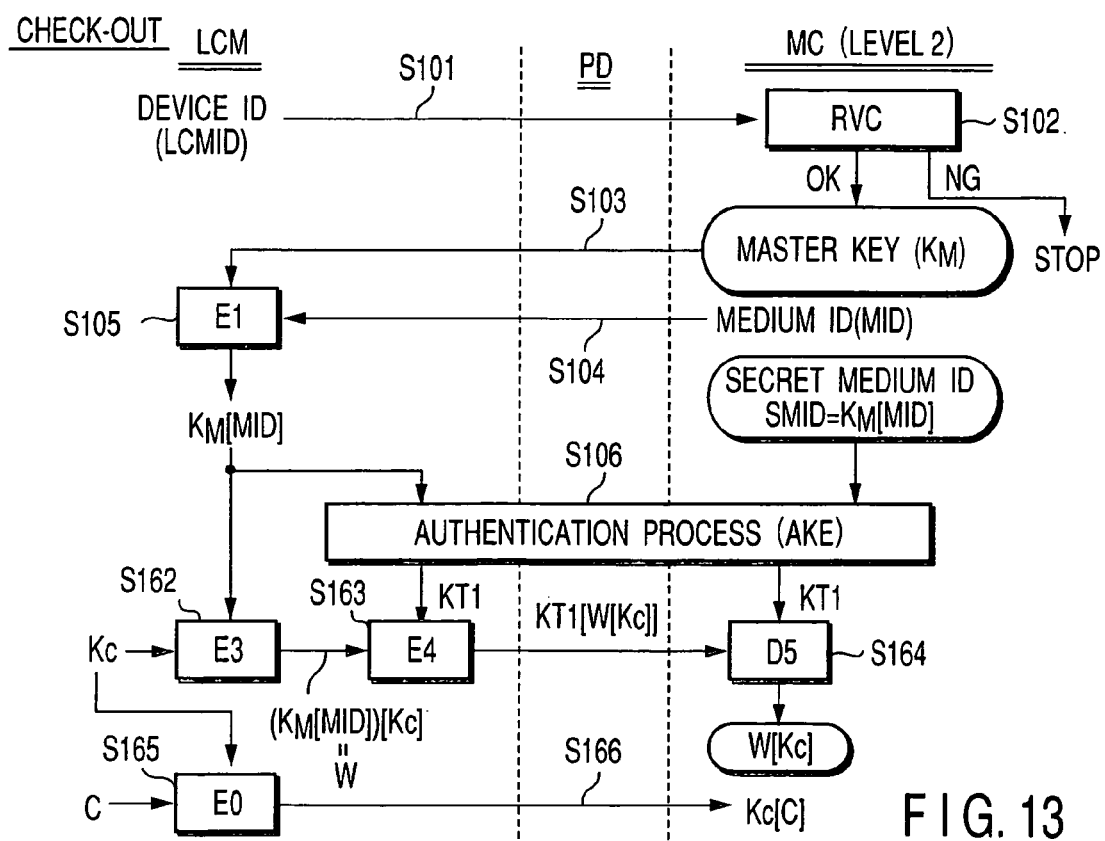
FIG. 13 is a chart for explaining another sequence of check-out when the type of recording medium is level 2.

Referring to FIG. 13, the LCM 1 encrypts contents decryption key Kc using $K_M$[MID] (to be expressed by w hereinafter) generated in step S105 (step S162). The LCM 1 further encrypts contents decryption key Kc encrypted by w (w[Kc]) using key information KT1 generated in the mutual authentication process (AKE) in step S106 (KT1[w[Kc]]), and then transfers it to the MC 13 (step S163).

The MC 13 decrypts the transferred KT1[w[Kc]] using key information KT1 generated in the mutual authentication process (AKE) in step S106 to obtain w[Kc], and stores it in the secret area 13c (step S164).

Contents C are encrypted using Kc (step S165), and are then transferred to the MC 13 (step S166) as in FIG. 10.

Figure 14:
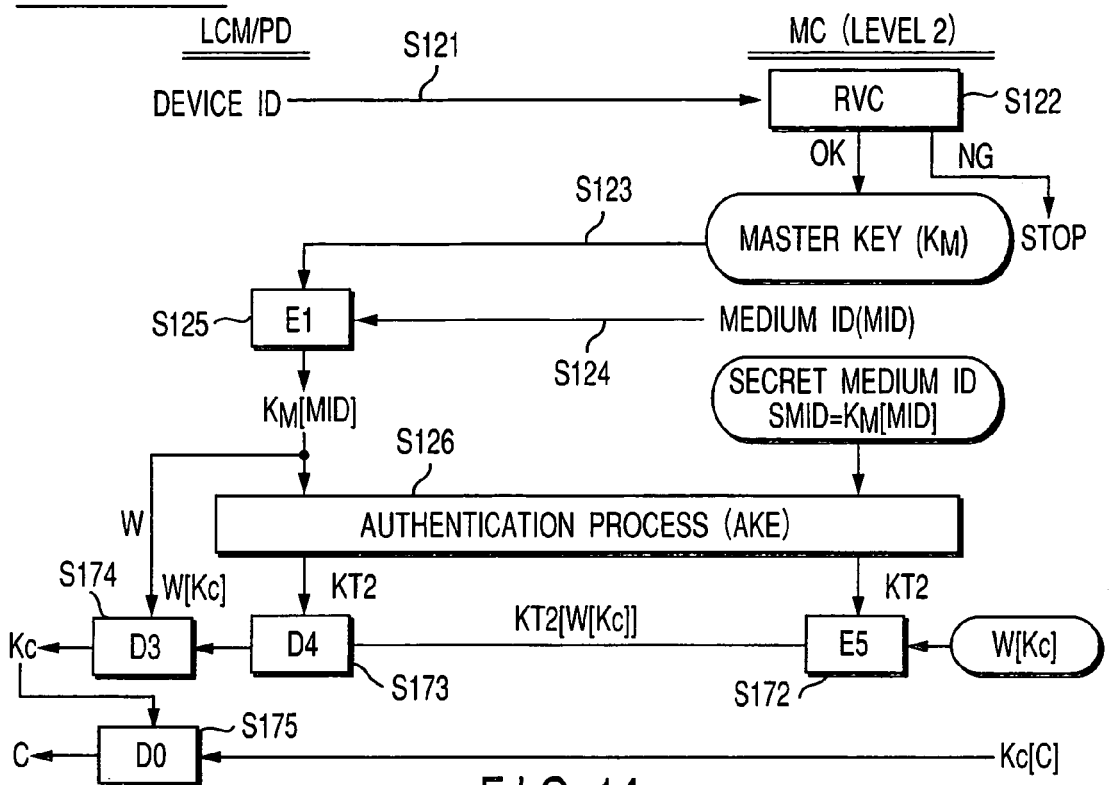
FIG. 14 is a chart for explaining another sequence of reproduction when the type of recording medium is level 2.

The reproduction process corresponding to the check-out process shown in FIG. 13 will be explained below with reference to FIG. 14. Note that the same reference numerals denote the same portions as those in FIG. 11, and only different portions will be explained below. More specifically, in FIG. 14 the MC 13 encrypts encrypted contents decryption key w[Kc] stored in the secret area 13c using key information KT2 generated in the mutual authentication process (AKE) in step S126 (KT2[w[Kc]]), and then transfers it to the LCM 1 or PD 12 (step S172). The LCM 1 or PD 12 decrypts KT2[w[Kc]] transferred from the MC 13 using key information KT2 generated in step S126 (step S173), and decrypts the obtained w[Kc] using w=$K_M$[KID] generated in step S123 to obtain contents decryption key Kc (step S174). The LCM 1 or PD 12 decrypts encrypted contents Kc[C] using this contents decryption key Kc to obtain contents C (step S175). In the LCM 1 or PD 12, the decoder 12h decodes contents C, and the D/A converter 12i converts the decoded contents from a digital signal into an analog signal, thereby reproducing the copied contents (e.g., music) recorded on the MC 13.

The check-in process corresponding to the check-out process shown in FIG. 13 is substantially the same as that described with reference to FIG. 12, except that contents decryption key w[Kc] encrypted by w=$K_M$[MID] is deleted from the secret area 13c of the MC 13 in step S148 in place of key information KT1.

3. Check-In/Check-Out/Reproduction Process of Copied Contents Using MC of Level 0

The check-in/check-out and reproduction processes using the MC 13 of level 0 with the format shown in FIG. 4A will be explained below.

In this case, the MC 13 is set in the PD 12, and executes a check-out process with the LCM 1 via the PD 12. The basic operation is the same as that of the MC 13 of level 2. However, in case of level 0, since the MC 13 has neither a secret area nor a medium ID, the PD 12 executes a process shown in FIG. 10 with respect to the LCM 1 in place of the MC 13 of level 0. For this purpose, the secret area of the PD 12 pre-stores master key $K_M$, secret device key SPDID, and a revocation list (RVC list). Note that master key $K_M$ need only have the same function as that of master key $K_M$ stored in the MC 13, but data itself need not be the same.

In step S3 in FIG. 9, the type of MC 13 is determined to be level 0.

A case will be explained below with reference to FIG. 15 wherein a check-out instruction is issued to the SMS 2 via a user interface (I/F) 15 or via the PD 12.

The SMS 2 checks the remaining number n of children of contents (e.g., having a contents ID="TID1") corresponding to a check-out request of the guest book. If n>0, the SMS 2 reads out the device ID (LCMID) of the corresponding LCM 1 from the device ID memory 4, and transfers it to the PD 12 (step S201).

The PD 12 checks if the transferred device ID is registered in the RVC list (step S202). If the transferred device ID is not registered, the PD 12 reads out master key $K_M$ by accessing its secret area, and transfers it to the LCM 1 (step S203). Furthermore, the PD 12 reads out its identification information, i.e., the device ID (PDID) from, e.g., the ROM 12c, and transfers it to the LCM 1 (step S204).

The LCM 1 encrypts the device ID (PDID) transferred from the PD 12 using master key $K_M$ to generate information ($K_M$[PDID]) required for a mutual authentication process (AKE) (step S205).

The LCM 1 executes the mutual authentication process (AKE) using the generated information $K_M$[PDID], while the PD 12 executes the mutual authentication process (AKE) using a secret device ID (SPDID) (step S206). Since the mutual authentication process in step S206 is the same as that shown in FIG. 21, a description thereof will be omitted.

If the LCM 1 and MC 13 confirm that they are authentic, the PD 12 stores the generated key information KT (in this case, KT1) in the secret area (step S207). The LCM 1 encrypts a decryption key (contents decryption key) Kc used to decrypt the encrypted contents (KT1[Kc]) using the key information KT1 generated in step S206, and transfers it to the MC 13 via the PD 12 (steps S208 and S209). Also, the LCM 1 encrypts contents C using Kc (Kc[C]), and transfers the encrypted contents to the MC 13 via the PD 12 (steps S210 and S211).

Finally, the SMS 2 subtracts "1" from the remaining number n of children of the contents with the contents ID="TID1" corresponding to the check-out request of the guest book, and adds identification information "m0" of that MC 13 in check-out list L1, as shown in FIG. 7B.

The MC 13 stores transferred encrypted contents decryption key KT1[Kc] and encrypted contents Kc[C] in the public area 13a.

FIG. 6 shows the storage contents of the MC 13 at completion of the aforementioned processes.

Figure 16:
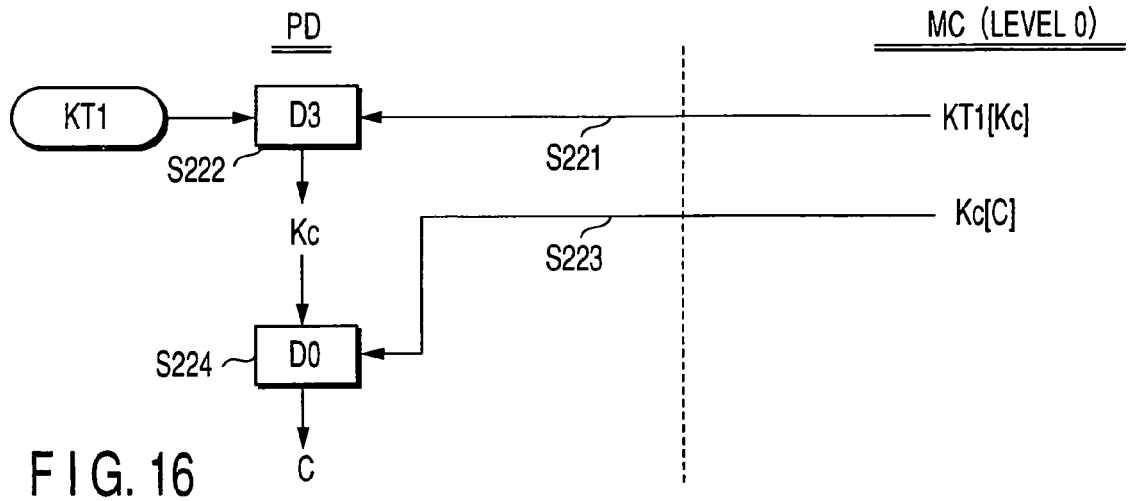
FIG. 16 is a chart for explaining a sequence of reproduction when the type of recording medium is level 0.

The processing operation between the PD 12 and MC 13 when the PD 12 receives a reproduction instruction will be explained below with reference to FIG. 16.

The MC 13 transfers encrypted contents decryption key KT1[Kc] recorded on its public area to the PD 12 (step S221). If the PD 12 is the one which was used to check out the contents to be reproduced with respect to the MC 13, it must store key information KT1 for decrypting the encrypted contents decryption key in its secret area (see step S207 in FIG. 15). Therefore, such authentic PD 12 can obtain contents decryption key Kc by decrypting KT1[Kc] transferred from the MC 13 using key information KT1 read out from its secret area (step S222). Furthermore, the PD can obtain contents C by decrypting encrypted contents Kc[C] transferred from the MC 13 using that contents decryption key Kc (steps S223 and S224). In the PD 12, the decoder 12h decodes contents C, and the D/A converter 12i converts the decoded contents from a digital signal into an analog signal, thereby reproducing the copied contents (e.g., music) recorded on the MC 13.

Figure 17:
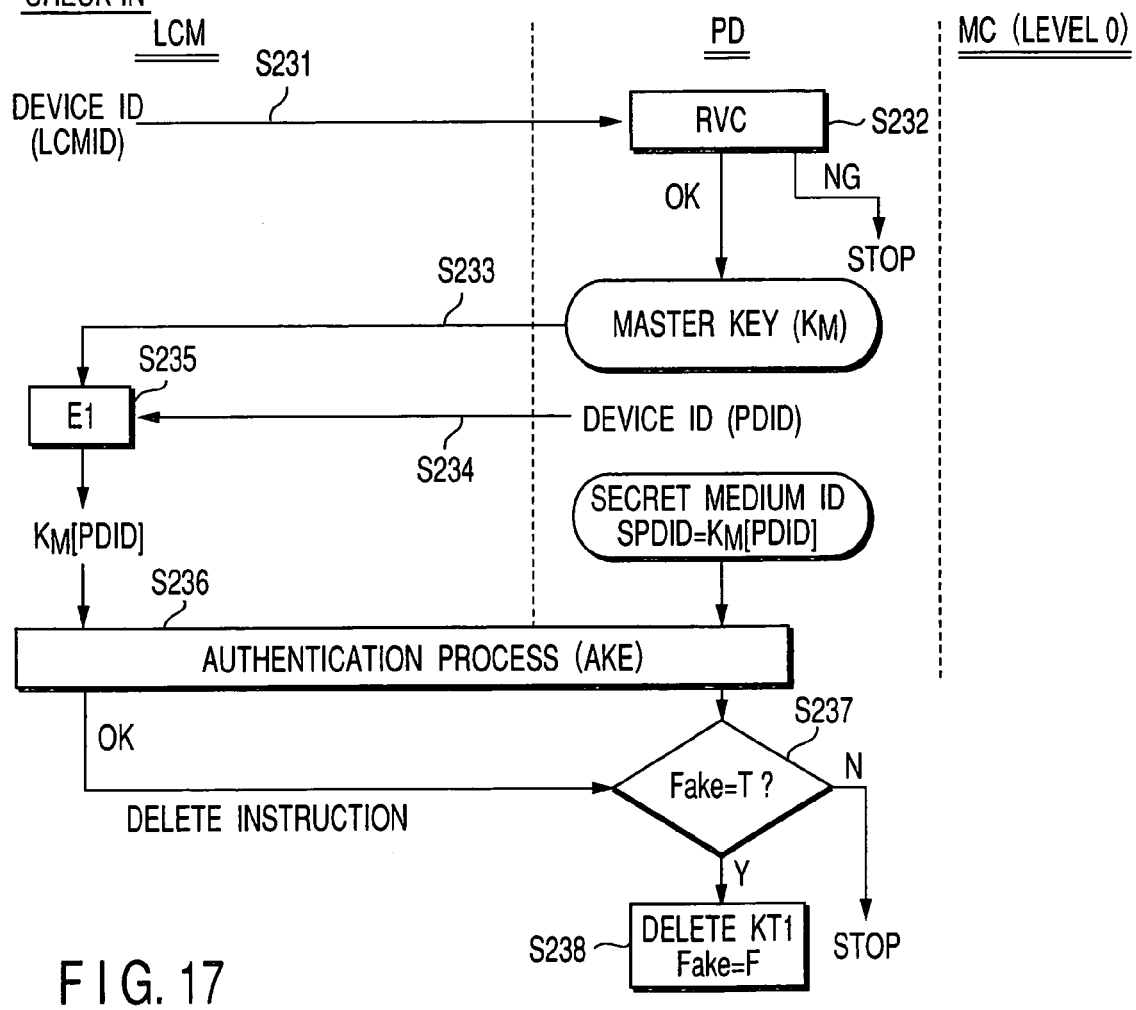
FIG. 17 is a chart for explaining a sequence of check-in when the type of recording medium is level 0.

A case will be explained below with reference to FIG. 17 wherein a check-in instruction is issued to the SMS 2 via the PD 12 (i.e., using the MC 13 set in the PD 12 connected to the LCM 1). In this case as well, the PD 12 executes a process shown in FIG. 12 with respect to the LCM 1 in place of the MC 13 of level 0 as in the check-out process.

The SMS 2 reads out the device ID (LCMID) of that LCM 1 from the device ID memory 4, and transfers it to the PD 12 (step S231).

The PD 12 checks if the transferred device ID is registered in the RVC list (step S232). If the transferred device ID is not registered, the PD 12 reads out master key $K_M$ by accessing its secret area, and transfers it to the LCM 1 (step S233). Furthermore, the PD 12 reads out its identification information (PDID) and transfers it to the LCM 1 (step S234).

The LCM 1 encrypts the device ID (PDID) transferred from the PD 12 using master key $K_M$ to generate information ($K_M$[PDID]) required for a mutual authentication process (AKE) (step S235).

The LCM 1 executes the mutual authentication process (AKE) using the generated information $K_M$[PDID], while the PD 12 executes the mutual authentication process (AKE) using a secret device ID (SPDID) (step S236).

Figure 22:
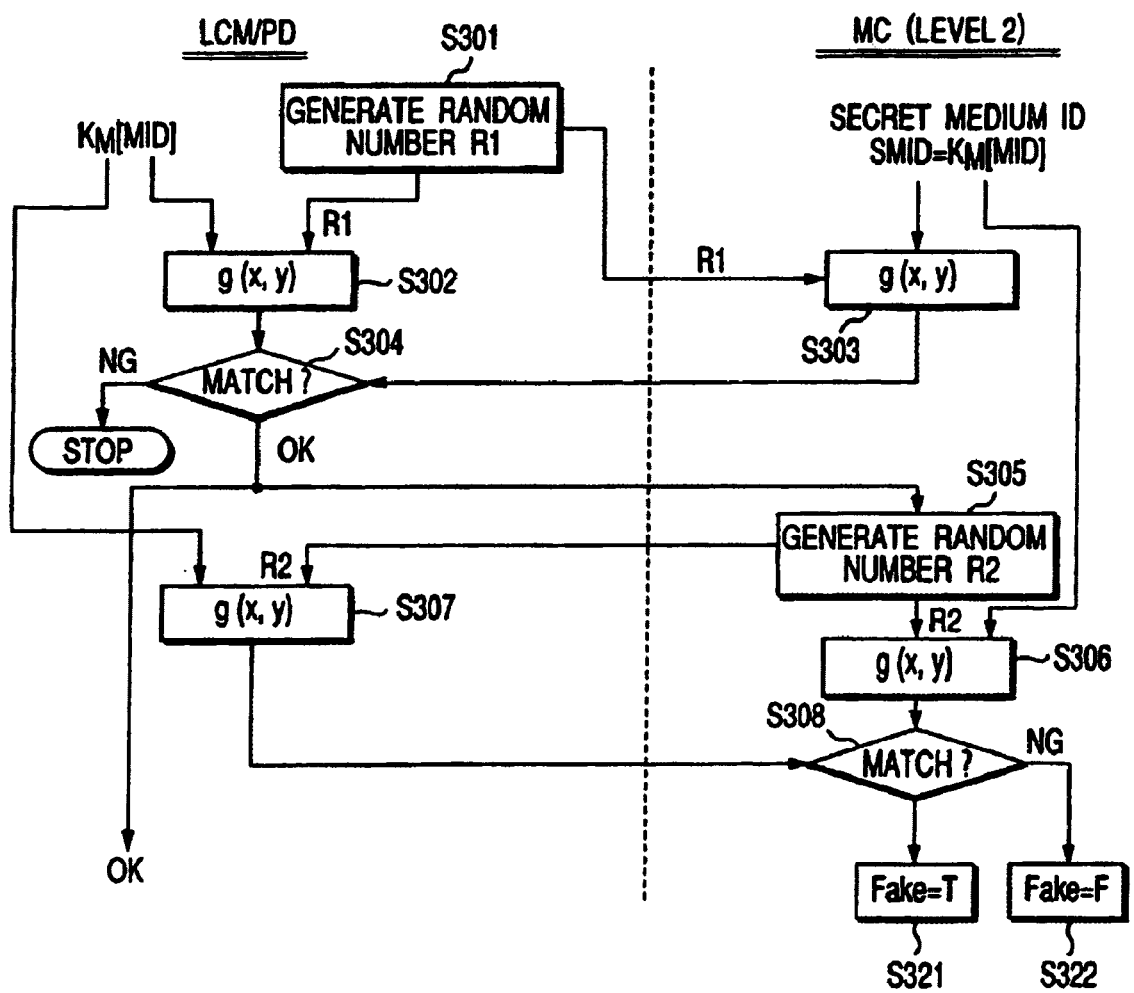
FIG. 22 is a chart for explaining another processing operation of a mutual authentication process (AKE).

Since the mutual authentication process (AKE) of step S236 in check-in is substantially the same as that shown in FIG. 22 except that $K_M$[PDID] replaces $K_M$[MID], and the secret device ID (SPDID) replaces the secret medium ID (SMID), a description thereof will be omitted.

If the LCM 1 confirms authenticity of the PD 12 in step S236 (step S304 in FIG. 22), it instructs the PD 12 to delete key information KT1 stored in its secret area. Upon receiving this instruction, the PD 12 checks the value of flag information Fake. If Fake="T", the PD 12 deletes key information KT1 from its secret area, and rewrites flag information Fake to "F" (steps S237 and S238). At this time, the encrypted contents stored in the public area 13a of the MC 13 may be erased by overwriting random numbers generated by the LCM 1 on them.

Finally, as shown in FIG. 7C, the SMS 2 adds "1" to the remaining number n of the contents with the contents ID="TID1" corresponding to the check-in request of the guest book, and deletes identification information m0 of that MC 13 from check-out list L1.

On the other hand, if the value of flag information Fake is "F", the subsequent process is canceled.

The processing operation in check-out, which is different from that shown in FIG. 15, will be described below with reference to FIG. 18. Note that the same reference numerals denote the same portions as those in FIG. 15, and only different portions will be explained below. That is, FIG. 18 is characterized by a process for contents decryption key Kc to be transferred to the PD 12, as in FIG. 13.

Figure 18:
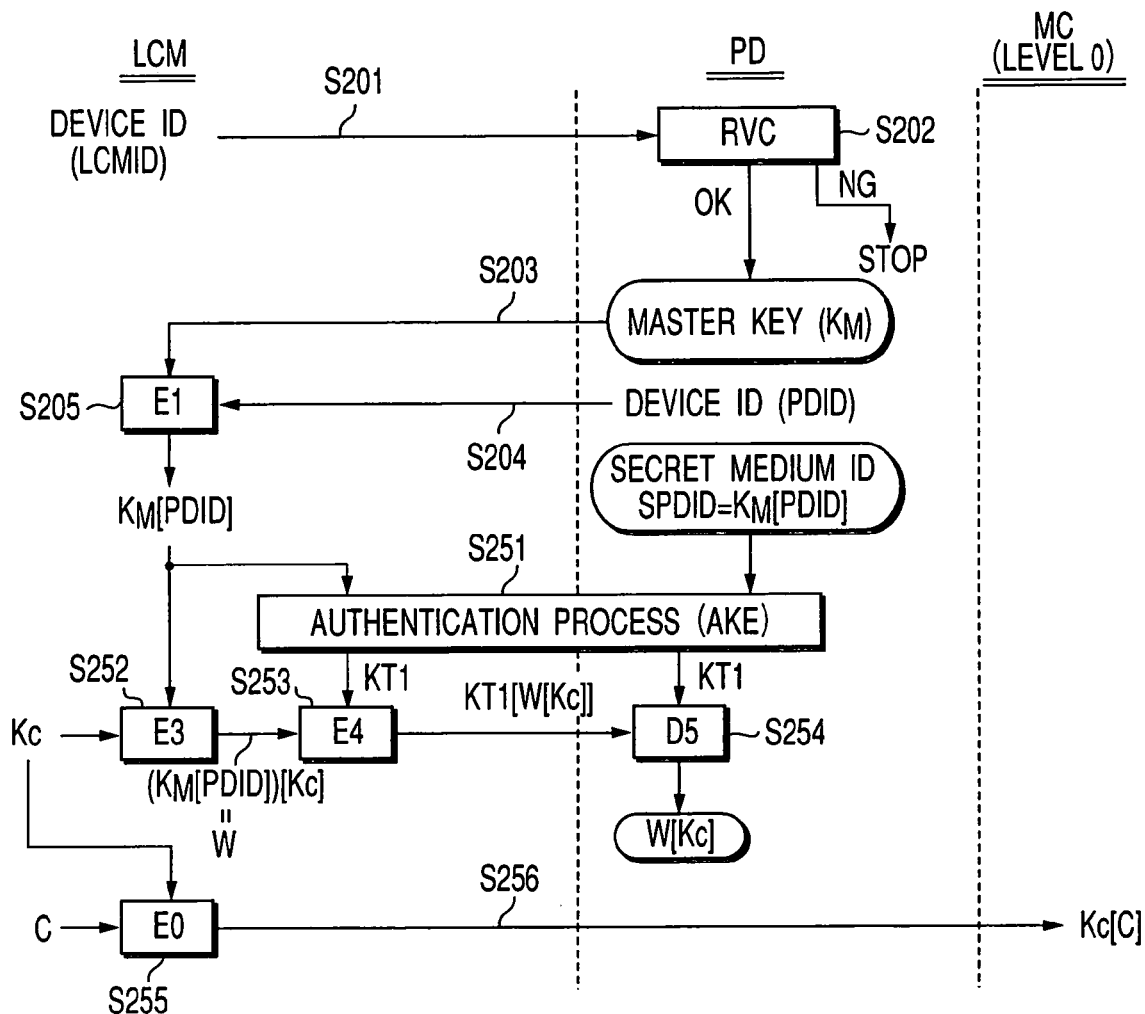
FIG. 18 is a chart for explaining another sequence of check-out when the type of recording medium is level 0.

Referring to FIG. 18, the LCM 1 encrypts contents decryption key Kc using $K_M$[PDID] (to be expressed by w hereinafter) generated in step S205 (step S252). The LCM 1 further encrypts contents decryption key Kc encrypted by w (w[Kc]) using key information KT1 generated in the mutual authentication process (AKE) in step S251 (KT1[w[Kc]]), and then transfers it to the PD 12 (step S253).

The PD 12 decrypts the transferred KT1[w[Kc]] using key information KT1 generated in the mutual authentication process (AKE) in step S251 to obtain w[Kc], and stores it in the secret area (step S254).

Figure 15:
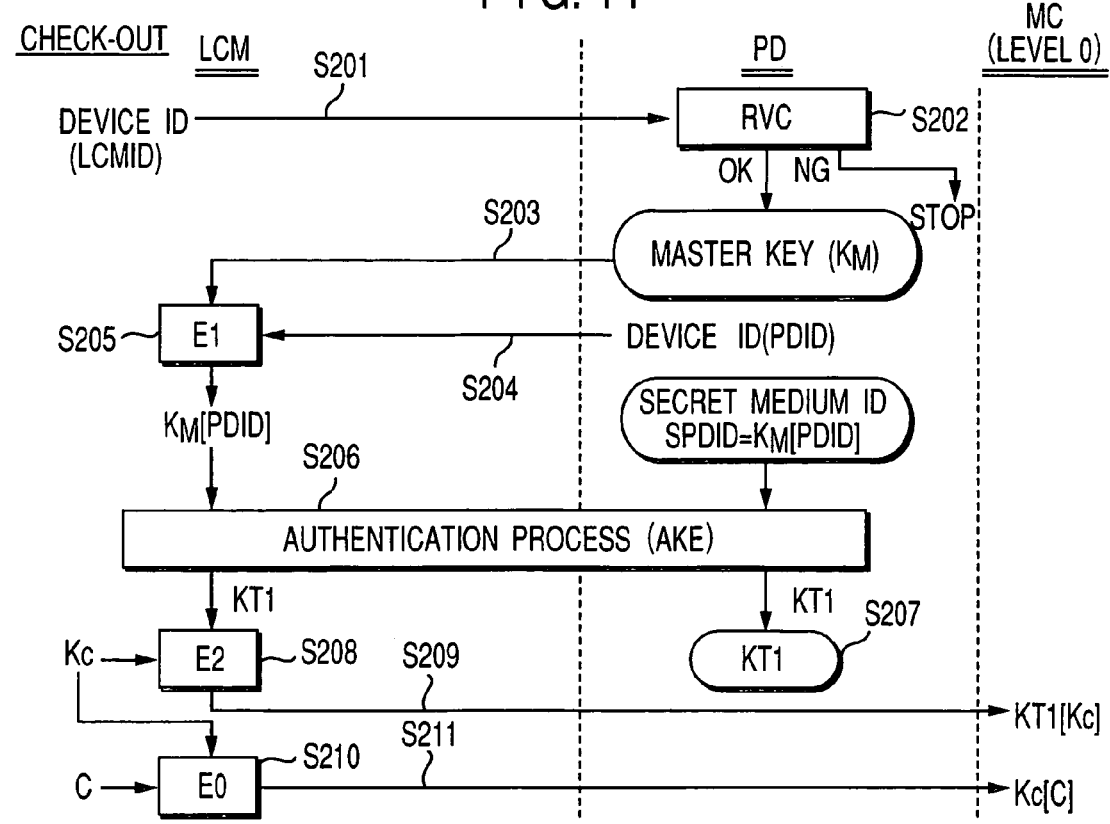
FIG. 15 is a chart for explaining a sequence of check-out when the type of recording medium is level 0.

Contents C are encrypted using Kc (step S255), and are then transferred to the MC 13 via the PD 12 (step S256), as in FIG. 15.

Figure 19:
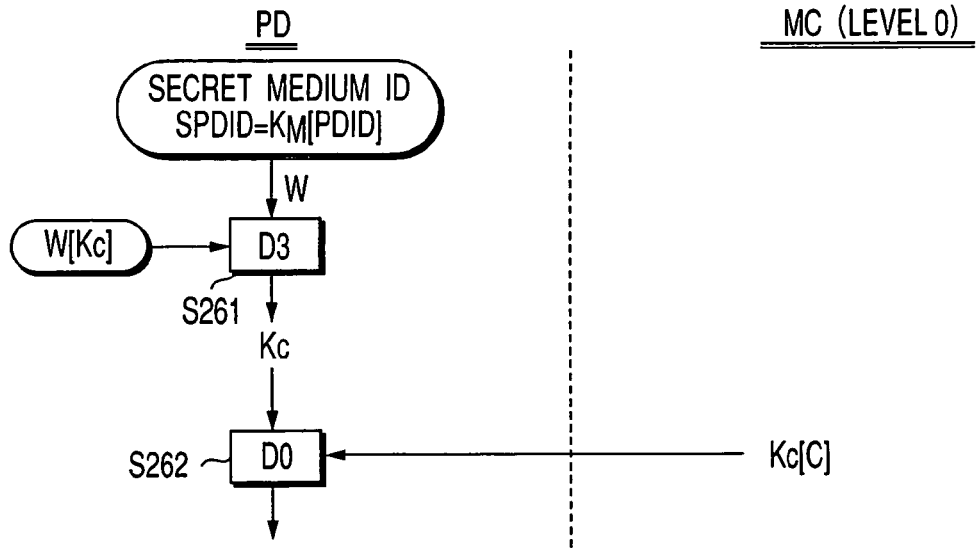
FIG. 19 is a chart for explaining another sequence of reproduction when the type of recording medium is level 0.

The reproduction process corresponding to the check-out process shown in FIG. 18 will be explained below with reference to FIG. 19. Note that the same reference numerals denote the same portions as those in FIG. 18, and only different portions will be explained below. More specifically, in FIG. 19 the PD 12 can obtain contents decryption key Kc by decrypting encrypted contents decryption key w[Kc] stored in its secret area using its secret device ID (SPDID=w) (step S261). The PD 12 can obtain contents C by decrypting encrypted contents Kc[C] transferred from the MC 13 using that contents decryption key Kc (step S262). In the PD 12, decoder 12h decodes contents C, and the D/A converter 12i converts the decoded contents from a digital signal into an analog signal, thereby reproducing the copied contents (e.g., music) recorded on the MC 13.

Figure 20:
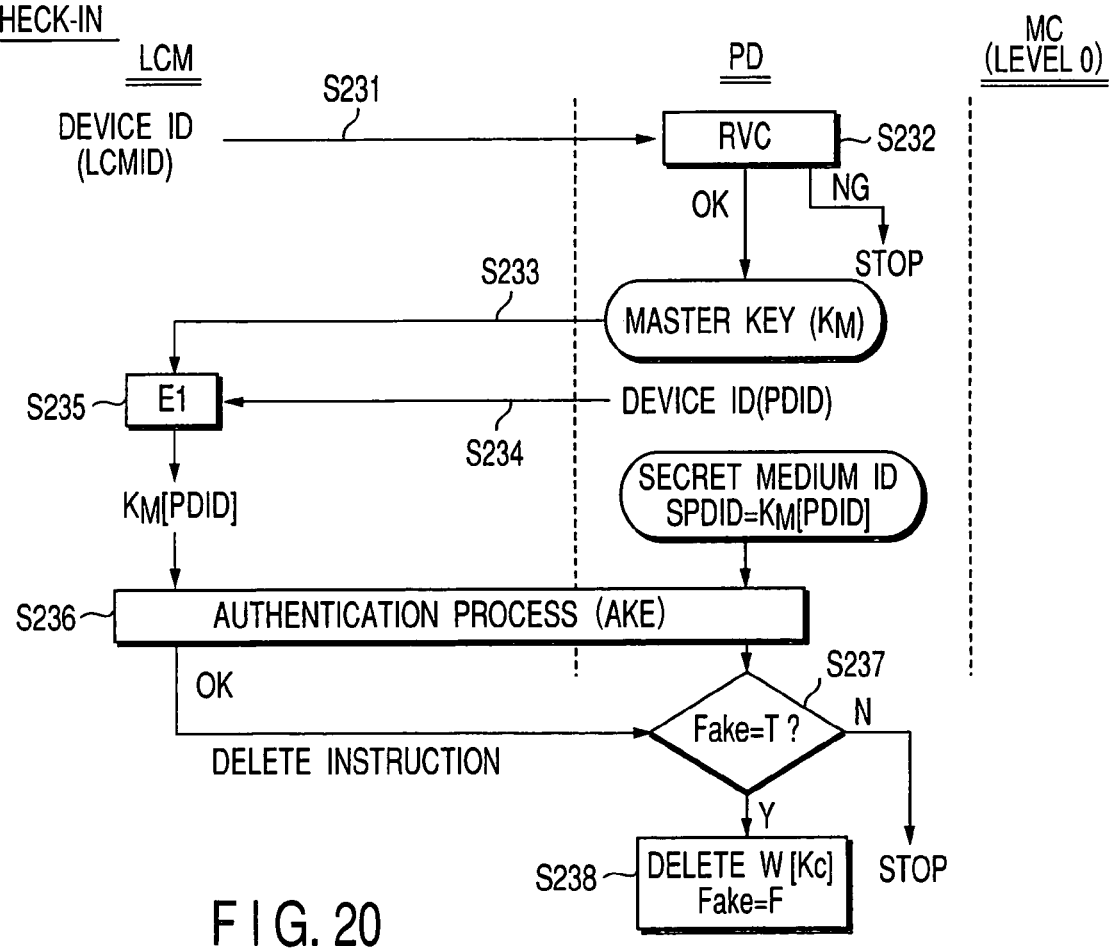
FIG. 20 is a chart for explaining another sequence of check-in when the type of recording medium is level 0.

The check-in process corresponding to the check-out process shown in FIG. 18 will be described below with reference to FIG. 20. Note that the description of FIG. 20 is substantially the same as that of FIG. 17, except that contents decryption key w[Kc] encrypted by w=$K_M$[PDID] is deleted from the secret area of the PD 12 in step S238 in place of key information KT1.

As described in detail above, according to the present invention, safe mutual authentication with high security can be implemented using a low-cost recording medium.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A mutual authentication method for use between a recording apparatus which records copied contents in a memory card as a removable recording medium having an arithmetic processing function, and the memory card, said method comprising:

storing, in a first read-only semiconductor memory in the memory card, first information which depends on the memory card;

storing, in a second semiconductor memory in the memory card, secret information obtained by encrypting the first information using second information which is to be shared by the memory card in executing mutual authentication with the recording apparatus and which depends on the memory card, the second semiconductor memory having a public area accessible by an access procedure and a secret area accessible only by a private access procedure, the secret information being stored in the secret area;

generating, by the recording apparatus, authentication information used in mutual authentication with the memory card on the basis of the first information obtained from the memory card;

executing mutual authentication between the recording apparatus and the memory card using the generated authentication information and the secret information, wherein executing the mutual authentication includes generating, by the recording apparatus, a first random number and transferring the first random number to the memory card, generating, by the recording apparatus, a first value from a first arithmetic function using the authentication information and the first random number, generating, by the memory card, a second value from a second arithmetic function using the secret information and the first random number, and transferring the second value to the recording apparatus, comparing, by the recording apparatus, the first value with the second value and transferring a first comparison result to the memory card, generating, by the memory card, a second random number if the first comparison result indicates a match, and transferring the second random number to the recording apparatus, generating, by the memory card, a third value from a third arithmetic function using the secret information and the second random number, generating, by the recording apparatus, a fourth value from a fourth arithmetic function using the authentication information and the second random number, and transferring the fourth value to the memory card, comparing, by the memory card, the third value with the fourth value and outputting a second comparison result, generating, by the memory card, a first key from a fifth arithmetic function using at least the secret information and the second random number if the second comparison result indicates a match, and generating, by the recording apparatus, a second key from a sixth arithmetic function using at least the authentication information and the second random number;

storing, by the memory card, the first key in the secret area of the memory card;

encrypting, by the recording apparatus, a content key using the second key and transferring the encrypted content key to the memory card;

encrypting, by the recording apparatus, a content using the content key and transferring the encrypted content to the memory card; and storing, by the memory card, the encrypted content key and the encrypted content in the public area of the memory card.

2. The method according to claim 1, further comprising:

generating, by the recording apparatus, the authentication information by encrypting the first information using the second information obtained from the memory card.

3. A mutual authentication method for use between a reproducing apparatus which reproduces copied contents recorded in a memory card as a removable recording medium having an arithmetic processing function, and the memory card, said method comprising:

storing, in a first read-only semiconductor memory in the memory card, first information which depends on the memory card;

storing, in a second semiconductor memory in the memory card, secret information obtained by encrypting the first information using second information which is to be shared by the memory card in executing mutual authentication with the reproducing apparatus and which depends on the memory card, the second semiconductor memory having a public area accessible by an access procedure and a secret area accessible only by a private access procedure, the secret information being stored in the secret area;

generating, by the reproducing apparatus, authentication information used in mutual authentication with the memory card on the basis of the first information obtained from the memory card;

executing mutual authentication between the reproducing apparatus and the memory card using the generated authentication information and the secret information, wherein executing the mutual authentication includes generating, by the reproducing apparatus, a first random number and transferring the first random number to the memory card, generating, by the reproducing apparatus, a first value from a first arithmetic function using the authentication information and the first random number, generating, by the memory card, a second value from a second arithmetic function using the secret information and the first random number, and transferring the second value to the reproducing apparatus, comparing, by the reproducing apparatus, the first value with the second value and transferring a first comparison result to the memory card, generating, by the memory card, a second random number if the first comparison result indicates a match, and transferring the second random number to the reproducing apparatus, generating, by the memory card, a third value from a third arithmetic function using the secret information and the second random number, generating, by the reproducing apparatus, a fourth value from a fourth arithmetic function using the authentication information and the second random number, and transferring the fourth value to the memory card, comparing, by the memory card, the third value with the fourth value and outputting a second comparison result, generating, by the memory card, a first key from a fifth arithmetic function using at least the secret information and the second random number if the second comparison result indicates a match, and generating, by the reproducing apparatus, a second key from a sixth arithmetic function using at least the authentication information and the second random number;

encrypting, by the memory card, a secret key stored in the secret area of the memory card using the first key and transferring the encrypted secret key to the reproducing apparatus;

decrypting, by the reproducing apparatus, the encrypted secret key using the second key to obtain the secret key;

transferring, by the memory card, an encrypted content key stored in the public area of the memory card to the reproducing apparatus;

decrypting, by the reproducing apparatus, the encrypted content key using the secret key to obtain a content key;

transferring, by the memory card, an encrypted content stored in the public area of the memory card to the reproducing apparatus; and decrypting, by the reproducing apparatus, the encrypted content using the content key to obtain a content.

4. The method according to claim 3, further comprising:
generating, by the reproducing apparatus, the authentication information by encrypting the first information using the second information obtained from the memory card.

5. A memory card as a removable recording medium having an arithmetic processing function, comprising:

a first read-only semiconductor memory storing first information which is unique to said memory card;

a second semiconductor memory storing secret information obtained by encrypting the first information using second information which is to be shared by said memory card for recording copied contents on said memory card and a reproducing apparatus for reproducing the copied contents in executing mutual authentication among the memory card, the recording apparatus, and the reproducing apparatus, the second information depending on said memory card, the second semiconductor memory having a public area accessible by an access procedure and a secret area accessible by only a private access procedure, the secret information being stored in the secret area;

mutual authentication means for executing mutual authentication between the memory card and the recording apparatus, and between the memory card and the reproducing apparatus using authentication information generated based on the first information by the recording apparatus and the reproducing apparatus, and the secret information, wherein the mutual authentication means includes means for generating a random number and transferring the random number to the recording apparatus, means for generating a value from a first arithmetic function using the secret information and the random number, means for comparing the value with a value transmitted from the recording apparatus and outputting a comparison result, and means for generating a first key from a second arithmetic function using at least the secret information and the random number if the comparison result indicates a match;

recording process means, including
means for storing the first key in the secret area of the memory card,
means for receiving an encrypted content key from the recording apparatus and storing the encrypted content key in the public area of the memory card, and
means for receiving an encrypted content from the recording apparatus and storing the encrypted content in the public area of the memory card; and reproducing process means, including
means for encrypting the secret key stored in the secret area of the memory card using a second key generated from the mutual authentication means and transferring the encrypted secret key to the reproducing apparatus,
means for transferring the encrypted content key stored in the public area of the memory card to the reproducing apparatus, and
means for transferring the encrypted content stored in the public area of the memory card to the reproducing apparatus.

6. A recording system including a memory card as a removable recording medium having an arithmetic processing function and a recording apparatus for recording copied contents in the memory card while limiting the number of copied contents to be recorded on the memory card, the recording system comprising:

a first read-only semiconductor memory in the memory card for storing first information which depends on the memory card;

a second semiconductor memory in the memory card for storing secret information obtained by encrypting the first information using second information which is to be shared by the memory card in executing mutual authentication with the recording apparatus and which depends on the memory card, the second semiconductor memory having a public area accessible by an access procedure and a secret area accessible by only a private access procedure, the secret information being stored in the secret area;

means, provided in the recording apparatus, for generating authentication information used in mutual authentication with the memory card on the basis of the first information obtained from the memory card;

means, provided in the recording apparatus and the memory card, for executing mutual authentication between the recording apparatus and the memory card using the generated authentication information and the secret information, including
means, provided in the recording apparatus, for generating a first random number and transferring the first random number to the memory card,
means, provided in the recording apparatus, for generating a first value from a first arithmetic function using the authentication information and the first random number,
means, provided in the memory card, for generating a second value from a second arithmetic function using the secret information and the first random number, and transferring the second value to the recording apparatus, means, provided in the recording apparatus, for comparing the first value with the second value and transferring a first comparison result to the memory card, means, provided in the memory card, for generating a second random number if the first comparison result indicates a match, and transferring the second random number to the recording apparatus, means, provided in the memory card, for generating a third value from a third arithmetic function using the secret information and the second random number, means, provided in the recording apparatus, for generating a fourth value from a fourth arithmetic function using the authentication information and the second random number, and transferring the fourth value to the memory card, means, provided in the memory card, for comparing the third value with the fourth value and outputting a second comparison result, means, provided in the memory card, for generating a first key from a fifth arithmetic function using the secret information and the second random number if the second comparison result indicates a match, and means, provided in the recording apparatus, for generating a second key from a sixth arithmetic function using the authentication information and the second random number;

means, provided in the memory card, for storing the first key in the secret area of the memory card;

means, provided in the recording apparatus, for encrypting a content key using the second key and transferring the encrypted content key to the memory card;

means, provided in the recording apparatus, for encrypting a content using the content key and transferring the encrypted content to the memory card; and means, provided in the memory card, for storing the encrypted content key and the encrypted content in the public area of the memory card.

7. A reproducing system including a memory card as a removable recording medium having an arithmetic processing function and a reproducing apparatus for reproducing copied contents recorded in the memory card, the reproducing system comprising:

a first read-only semiconductor memory in the memory card for storing first information which depends on the memory card;

a second semiconductor memory, provided in the memory card, for storing secret information obtained by encrypting the first information using second information which is to be shared by the memory card in executing mutual authentication with the reproducing apparatus and depends on the memory card, the second semiconductor memory having a public area accessible by an access procedure and a secret area accessible by only a private access procedure, the secret information being stored in the secret area;

means, provided in the reproducing apparatus, for generating authentication information used in mutual authentication with the memory card on the basis of the first information obtained from the memory card;

means, provided in the reproducing apparatus and the memory card, for executing mutual authentication between the reproducing apparatus and the memory card using the generated authentication information and the secret information, including means, provided in the reproducing apparatus, for generating a first random number and transferring the first random number to the memory card, means, provided in the reproducing apparatus, for generating a first value from a first arithmetic function using the authentication information and the first random number, means, provided in the memory card, for generating a second value from a second arithmetic function using the secret information and the first random number, and transferring the second value to the reproducing apparatus, means, provided in the reproducing apparatus, for comparing the first value with the second value and transferring a first comparison result to the memory card, means, provided in the memory card, for generating a second random number if the first comparison result indicates a match, and transferring the second random number to the reproducing apparatus, means, provided in the memory card, for generating a third value from a third arithmetic function using the secret information and the second random number, means, provided in the reproducing apparatus, for generating a fourth value from a fourth arithmetic function using the authentication information and the second random number, and transferring the fourth value to the memory card, means, provided in the memory card, for comparing the third value with the fourth value and outputting a second comparison result, means, provided in the memory card, for generating a first key from a fifth arithmetic function using the secret information and the second random number if the second comparison result indicates a match, and means, provided in the reproducing apparatus, for generating a second key from a sixth arithmetic function using the authentication information and the second random number;

means, provided in the memory card, for encrypting a secret key stored in the secret area of the memory card using the first key and transferring the encrypted key to the reproducing apparatus;

means, provided in the reproducing apparatus, for decrypting the encrypted secret key using the second key to obtain the secret key;

means, provided in the memory card, for transferring an encrypted content key stored in the public area of the memory card to the reproducing apparatus;

means, provided in the reproducing apparatus, for decrypting the encrypted content key using the secret key to obtain a content key;

means, provided in the memory card, for transferring an encrypted content stored in the public area of the memory card to the reproducing apparatus; and means, provided in the reproducing apparatus, for decrypting the encrypted content using the content key to obtain a content.

* * * * *